United States Patent [19]
Fujiki

[11] Patent Number: 5,862,505
[45] Date of Patent: Jan. 19, 1999

[54] MISFIRE DISCRIMINATING METHOD AND APPARATUS FOR AN ENGINE

[75] Inventor: Haruo Fujiki, Tokyo, Japan

[73] Assignee: Fuji Jukogyo Kabushiki Kaisha, Tokyo, Japan

[21] Appl. No.: 87,183

[22] Filed: Jul. 7, 1993

[30] Foreign Application Priority Data

Jul. 21, 1992 [JP] Japan .................................. 4-194213

[51] Int. Cl.$^6$ ................................................... G06G 7/76
[52] U.S. Cl. .......................... 701/111; 701/110; 701/101; 73/117.3; 73/116; 123/416; 123/436; 123/419
[58] Field of Search ................... 364/431.01–431.12, 364/550, 565, 424.03, 551.01; 73/117.3, 116, 118.2, 35, 117.2, 118.1; 123/425, 414, 416, 419, 479, 491, 436, 554, 435, 417

[56] References Cited

U.S. PATENT DOCUMENTS

| | | | |
|---|---|---|---|
| 4,503,821 | 3/1985 | Miyaki et al. | 123/357 |
| 4,883,038 | 11/1989 | Nakaniwa | 123/436 |
| 4,932,379 | 6/1990 | Tang et al. | 123/436 |
| 4,987,770 | 1/1991 | Nanyoshi et al. | 73/115 |
| 5,016,591 | 5/1991 | Nanyoshi et al. | 123/419 |
| 5,105,657 | 4/1992 | Nakaniwa | 73/117.3 |
| 5,116,259 | 5/1992 | Demizu et al. | 73/117.3 |
| 5,191,788 | 3/1993 | Nishimura | 73/117.3 |
| 5,216,915 | 6/1993 | Sakamoto | 73/117.3 |
| 5,222,394 | 6/1993 | Imai | 73/117.3 |
| 5,241,480 | 8/1993 | Takaku et al. | 364/431.07 |
| 5,268,843 | 12/1993 | Imai | 364/431.08 |
| 5,287,282 | 2/1994 | Imai | 364/431.08 |
| 5,303,158 | 4/1994 | Kuroda | 364/431.08 |
| 5,307,670 | 5/1994 | Imai et al. | 73/117.3 |

*Primary Examiner*—Jacques H. Louis-Jacques
*Attorney, Agent, or Firm*—Beveridge, DeGrandi, Weilacher & Young, LLP

[57] ABSTRACT

A rotational difference between the speed corresponding to a cylinder at a combustion stroke and the speed corresponding to the cylinder at a previous combustion is calculated. Then, a corrected value is derived from averaging all the rotational differences up to the present combustion stroke. A corrected rotational difference is calculated by subtracting the corrected value from the rotational difference. The misfire judgment level is calculated and set with an interpolated calculation by referring to the map that has the parameters of engine speed and fuel injection pulse width. The level is then compared with the corrected rotational difference. If the corrected rotational difference is larger than the misfire judgement level, and if the corrected rotational difference at the previous combustion stroke is smaller than the level that has a minus value, it can be accurately judged that the cylinder at the previous combustion stroke is in a condition of misfire.

34 Claims, 24 Drawing Sheets

FIG. 14A THROTTLE OPENING DEGREE

FIG. 14D VEHICLE SPEED

FIG. 14E FOR/AFT WARD ACCELERATION

FIG. 14F UP/DOWN WARD ACCELERATION

FIG. 14G ROTATIONAL DIFFERENCE AFTER CORRECTION

→ TIME

MISFIRE DISCRIMINATING METHOD AND APPARATUS FOR AN ENGINE

BACKGROUND OF THE INVENTION

The present invention relates to a misfire discriminating method for an engine wherein a misfire is detected from the variation in the rotation of an engine.

In general, it is ideal for producing a stable output that combustion in a multicylinder engine undergoes the same process every cycle. In the multicylinder engine, however, the combustion is liable to fluctuate for such reasons as listed below:

(1) Nonuniformity in the distribution rate of intake air attributed to the complication of the shape of an intake pipe, the interferences of the intake air among cylinders, etc.
(2) Some differences among the combustion temperatures of the individual cylinders attributed to cooling routes.
(3) Manufactural scattering in the volumes of the combustion chambers of the individual cylinders, the shapes of pistons, etc.

Heretofore, the so-called combustion fluctuation has been suppressed to the minimum by the air fuel ratio controls and ignition timing controls of the individual cylinders. In a recent high-performance engine tending toward a higher output and a lower fuel cost, however, when any of the injectors, ignition plugs etc. has deteriorated or broken down, intermittent misfire arises and incurs lowering in the output.

In general, a misfire of a cylinder can be detected by detecting a variation in the rotation of the engine due to the misfire and comparing the variation in the rotation with a predetermined discriminating level. For example, according to the official gazette of Japanese Patent Application Laid-open No. 118031/1987, there is disclosed a technique for discriminating an abnormal combustion cylinder based on a maximum value of a variation in the rotation of an engine and a counted value of pulse signals by measuring an interval of a plurality of pulse signals generated at each one revolution of a crankshaft, and discriminating the maximum value of the variation in the rotation of the engine from a timing change of the pulse interval.

Further, according to the official gazette of Japanese Patent application Laid-open No. 112646/1990, there is disclosed a technique for detecting an abnormal cylinder from a variation in the momentary rotation of each cylinder by detecting a plurality of angular positions per one revolution of a multicylinder internal combustion engine, and detecting the momentary rotation of a special rotating position of each cylinder from an interval of the detected angular positions.

However, a variation in the rotation due to a cause except the misfire might occur in the engine. For example, when a variation in the rotation occurs continuously for a predetermined time due to a snatch, it is difficult to distinguish the variation in the rotation due to the snatch from the variation in the rotation due to the misfire, and an erroneous discrimination might occur merely by comparing the variation in the rotation of the engine with the misfire discrimination level.

In addition, in order to normally detect the rotating speed of the engine, it is, for example, necessary to provide a rotor to be rotated in cooperation with a crank shaft driver by the engine and rotation detecting means composed of a sensor for detecting a predetermined position corresponding to a cranking position of the rotor. A small mounting position error exists at the rotor and the sensor for constituting the rotation detecting means in each engine, and allowable errors in manufacture of the respective components exist.

Therefore, the variation in the rotating speed of the engine to be detected by the rotation detecting means includes the above-described error different at each engine. If the misfire is discriminated according to a unitarily set discrimination level, an erroneous discrimination might occur.

Moreover, a relatively small variation in the rotation of the engine might occur due to a cause except the misfire such as a stepwise difference due to acceleration/deceleration. If a misfire once occurs, continuous misfires might occur among the cylinders. In such a case, if the misfire is discriminated merely by comparing the variation in the rotation of the engine with a misfire discrimination level, the variation in the rotation due to nonmisfire mightly erroneously discriminated as the misfire, or, on the contrary, the continuous misfire might be erroneously discriminated as the mere variation in the rotation, and hence it is difficult to accurately detect the misfire.

Even when the intermittent misfire has occurred in one cylinder in the multicylinder engine, a driver often drives an automobile without noticing the misfire. Besides, it is difficult to diagnose during the drive whether the cause of the misfire is temporary or is the deterioration of any of the injectors, the ignition plugs etc.

Therefore, according to the official gazette of Japanese Patent Application Laid-open No. 258955/1986 by way of example, a comparison is made between the difference of the minimum value and maximum value of the r.p.m. of an engine corresponding to a cylinder at the previous combustion stroke and the difference of the minimum value and maximum value of the engine r.p.m. corresponding to the cylinder at the present combustion stroke. The combustion condition of the pertinent cylinder is discriminated, depending upon whether or not the discrepancy between the compared values falls within a preset reference value. In a case where abnormal combustion has occurred in excess of a predetermined number of times, a misfire is judged, and warning is given.

With the prior-art technique mentioned above, the misfire condition is discriminated by grasping the revolution fluctuation of the engine. However, when the misfire is diagnosed at the cranking of the engine or at the initial stage of firing start at which the revolution fluctuation is great, the diagnosis is liable to become erroneous and poses a problem in reliability.

SUMMARY OF THE INVENTION

The present invention has been made in view of the above circumstances, and has for its object to provide a misfire discriminating method for an engine which can accurately detect a misfire of a cylinder without influence of the variation in the rotation of the engine due to a cause except the misfire Another object of the present invention is to provide a misfire discriminating method for an engine which can accurately detect a misfire of a cylinder by eliminating influence of an error regarding rotation detecting means for detecting the rotation of the engine when the misfire is detected based on the output from the rotation detecting means for detecting the rotation of the engine.

Still another object of the present invention is to provide a misfire discriminating method for an engine which can accurately detect a misfire of a cylinder without influence of the variation in the rotation of the engine due to a cause except the misfire even when the misfires continuously occur.

In order to accomplish the object, a misfire discriminating method for an engine (1) with a crankshaft (1*b*) for outputting power and a camshaft (1c) for actuating valves having, a crank plate (31) connected to said crankshaft (1b) for indicating an crank angle, a crank angle sensor (32) for detecting said crank angle (8) of said crankshaft (1b) and for generating a crank angle signal, a cam plate (33) connected to said camshaft (1c) for indicating a cam position, a cam angle sensor (34) for detecting said cam position of said camshaft (1c) and for producing a cam angle signal, and control means (41) responsive to said crank angle and said cam angle for controlling an ignition timing of said engine (1), an improvement of the method which comprises the steps of:

sensing a first engine r.p.m. (MNXn) of a first cylinder number (#n) at a present combustion stroke; (S102)

detecting a second engine r.p.m. (MNXn−1) of a second cylinder number (#n−1) at a previous combustion stroke; (S102)

calculating a rotational difference (DELNEn) by subtracting said second engine r.p.m. (MNXn−1) from said first engine r.p.m. (MNXn); (S103)

computing a rotational difference ((DELNAn) after correction by comparing said rotational difference (DELNEn) with a reference value (AVEDNOn) corresponding to an engine operating condition; (S406)

deriving a difference change (DDNEAn) by subtracting a previous rotational difference (DELNAn−1) from said rotational difference (DELNAn); (S107) and judging a misfire condition for said previous cylinder (#n−1) when said difference change (DDNEAn) is larger than a predetermined misfire level (LVLMIS) and also when a previous difference change (DENEAn−1) is smaller than a minus value of said predetermined misfire level (−LVLMIS). (S203,S204)

With the above method for discriminating the misfire of the engine, according to the output from the rotation detecting means, a first engine r.p.m. (MNXn) of a first cylinder number (#n) at a present combustion stroke, (S102) is sensed, a second engine r.p.m. (MNXn−1) of a second cylinder number (#n−1) at a previous combustion stroke is detected, (S102), a rotational difference (DELNEn) is calculated by subtracting said second engine r.p.m. (MNXn−1) from said first engine r.p.m. (MNXn); (S103), a rotational difference ((DELNAn) after correction is computed by comparing said rotational difference (DELNEn) with a reference value (AVEDNOn) corresponding to an engine operating condition; (S406), a difference change (DDNEAn) is derived by subtracting a previous rotational difference (DELNAn−1) from said rotational difference (DELNAn); (S107) and a misfire condition for said previous cylinder (#n−1) is judged when said difference change (DDNEAn) is larger than a predetermined misfire level (LVLMIS) and also when a previous difference change (DENEAn−1) is smaller than a minus value of said predetermined misfire level (−LVLMIS). (S203,S204).

More concretely, the present invention provides, according to a second embodiment of the present invention, a misfire discriminating method for an engine (1) with a crankshaft (1b) for outputting power and a camshaft (1c) for actuating valves having, a crank plate (31) connected to said crankshaft (1b) for indicating an crank angle, a crank angle sensor (32) for detecting said crank angle (8) of said crankshaft (1b) and for generating a crank angle signal, a cam plate (33) connected to said camshaft (1c) for indicating a cam position, a cam angle sensor (34) for detecting said cam position of said camshaft (1c) and for producing a cam angle signal, and control means (41) responsive to said crank angle and said cam angle for controlling an ignition timing of said engine (1), an improvement of the method which comprises the steps of:

sensing a first engine r.p.m. (MNXn) of a first cylinder number (#n) at a present combustion stroke; (S402)

detecting a second engine r.p.m. (MNXn−1) of a second cylinder number (#n−1) at a previous combustion stroke; (S402)

calculating a rotational difference (DELNEn) by subtracting said second engine r.p.m. (MNXn−1) from said first engine r.p.m. (MNXn); (S403)

deriving an average difference value (AVEDNnOLD) by weighted-averaging said rotational difference (DELNEn) between said present and previous combustion stroke; (S421,422)

computing a rotational difference (DELNAn) after correction by subtracting said average difference value (AVEDNnOLD) from said rotational difference (DELNEn) corresponding to an engine operating condition; (S406) and judging a misfire condition for said present cylinder (#n) when said rotational difference (DELNAn) after correction is smaller than a minus value of said predetermined misfire level (−LVLMIS). (S412)

With the above construction according to another object of the present invention, a first engine r.p.m. (MNXn) of a first cylinder number (#n) at a present combustion stroke is sensed, a second engine r.p.m. (MNXn−1) of a second cylinder number (#n−1) at a previous combustion stroke, is detected, a rotational difference (DELNEn) is calculated by subtracting said second engine r.p.m. (MNXn−1) from said first engine r.p.m. (MNXn), and an error of the rotation detecting means is corrected. And, a discrimination level set based on the engine operating state is compared with the rotational difference after correction to detect a misfire.

Further, the rotational difference is weigh-averaged, and the value based on the weighed average of the rotational difference is used as the rotational difference after correction to correct the error of the rotation detecting means.

Further, the present invention provide, according to a third embodiment of the present invention, a misfire discriminating method for an engine (1) with a crankshaft (1b) for outputting power and a camshaft (1c) for actuating valves having, a crank plate (31) connected to said crankshaft (1b) for indicating an crank angle, a crank angle sensor (32) for detecting said crank angle (8) of said crankshaft (1b) and for generating a crank angle signal, a cam plate (33) connected to said camshaft (1c) for indicating a cam position, a cam angle sensor (34) for detecting said cam position of said camshaft (1c) and for producing a cam angle signal, and control means (41) responsive to said crank angle and said cam angle for controlling an ignition timing of said engine (1), an improvement of the method which comprises the steps of:

sensing a first engine r.p.m. (MNXn) of a first cylinder number (#n) at a present combustion stroke; (S102)

detecting a second engine r.p.m. (MNXn−1) of a second cylinder number (#n−1) at a previous combustion stroke; (S102)

calculating a rotational difference (DELNEn) by subtracting said second engine r.p.m. (MNXn−1) from said first engine r.p.m. (MNXn); (S103)

computing a rotational difference (DELNAn) after correction by comparing said rotational difference (DELNEn) with a reference value (AVEDNOn) corresponding to an engine operating condition; (S106)

deriving a difference change (DDNEAn) by subtracting a previous rotational difference (DELNAn-1) from said rotational difference ((DELNAn); (S107) and judging a start of a misfire condition for said previous cylinder (#N-I) when said difference change (DDNEAn) is smaller than a minus value of a predetermined misfire level (-LVLMIS); (S503) and deciding a finish of said misfire condition for said present cylinder (#n) when a previous difference change (DDNEAn-1) is larger than said predetermined misfire level (LVLMIS). (S506)

With the above structure according to still another object of the present invention, in the misfire discriminating method for the engine according to the third embodiment, a first engine r.p.m. (MNXn) of a first cylinder number (#n) at a present combustion stroke, is sensed, a second engine r.p.m. (MNXn-1) of a second cylinder number (#n-1) at a previous combustion stroke, is detected, a rotational difference (DELNEn) is calculated by subtracting said second engine r.p.m. (MNXn-1) from said first engine r.p.m. (MNXn), and the start of a misfire cylinder and the finish of the misfire cylinder are discriminated from the rotational difference change. More specifically, a rotational difference (DELNAn) after correction is computed by comparing said rotational difference (DELNEn) with a reference value (AVEDNOn) corresponding to an engine operating condition; (S106) a difference change (DDNEAn) is derived by subtracting a previous rotational difference (DELNAn-1) from said rotational difference ((DELNAn); (S107) and a start of a misfire condition for said previous cylinder (#N-I) is judged when said difference change (DDNEAn) is smaller than a minus value of a predetermined misfire level (-LVLMIS); (S503) and a finish of said misfire condition for said present cylinder (#n) is decided when a previous difference change (DDNEAn-1) is larger than said predetermined misfire level (LVLMIS). (S506)

BRIEF DESCRIPTION OF THE DRAWINGS

FIGS. 1–13 and 14A–14E illustrate the first embodiment of a misfire discriminating method for an engine according to the present invention, in which FIG. 1 is a flow chart showing a subroutine of a single misfire diagnosis, FIG. 2 is a flow chart showing a misfire diagnosis routine, FIG. 3 is a flow chart showing another misfire diagnosis routine, FIG. 4 is a flow chart showing a subroutine of a misfire discrimination, FIG. 5 is a schematic diagram of an engine control system, FIG. 6 is a front view of a crank rotor and a crank angle sensor, FIG. 7 is a front view of a cam rotor and a cam angle sensor, FIG. 8 is a circuit diagram of an electronic control system, FIG. 9 is a time chart showing the relationship among crank pulses, cam pulses, cylinders at a combustion stroke and ignition timings, FIG. 10 is an explanatory view showing a rotational difference before correction, FIG. 11 is an explanatory view showing a rotational difference after correction, FIG. 12 is an explanatory view showing a rotational difference at the time of a misfire, FIG. 13 is an explanatory view showing a misfire discrimination level, and FIGS. 14A through 14G are explanatory views showing an operating state and a rotational difference at the time of a snatch occurrence;

FIGS. 15–20 illustrate the second embodiment of the present invention, in which FIG. 15 is a flow chart showing a misfire diagnosis routine, FIG. 16 is a flow chart showing another misfire diagnosis routine, FIG. 17 is a circuit diagram of an electronic control system, FIG. 18 is a time chart showing the relationship among crank pulses, cam pulses, cylinders at a combustion stroke, and ignition timings, FIG. 19 is an explanatory view showing a rotational difference after correction, and FIG. 20 is an explanatory view showing a rotational difference at the time of a misfire;

FIGS. 21–25 illustrate the third embodiment of the present invention, in which FIG. 21 is a flow chart showing a subroutine of a continuous misfire diagnosis, FIG. 22 is a flow chart showing a misfire diagnosis routine, FIG. 23 is an explanatory view showing a rotational difference before correction, FIG. 24 is an explanatory view showing a rotational difference after correction, and FIG. 25 is an explanatory view showing a rotational difference at the time of a continuous misfire occurrence.

DESCRIPTION OF THE PREFERRED EMBODIMENTS

Now, embodiments of the present invention will be described with reference to the drawings.

FIGS. 2–9 illustrate a first embodiment of the present invention.

Figure 5:
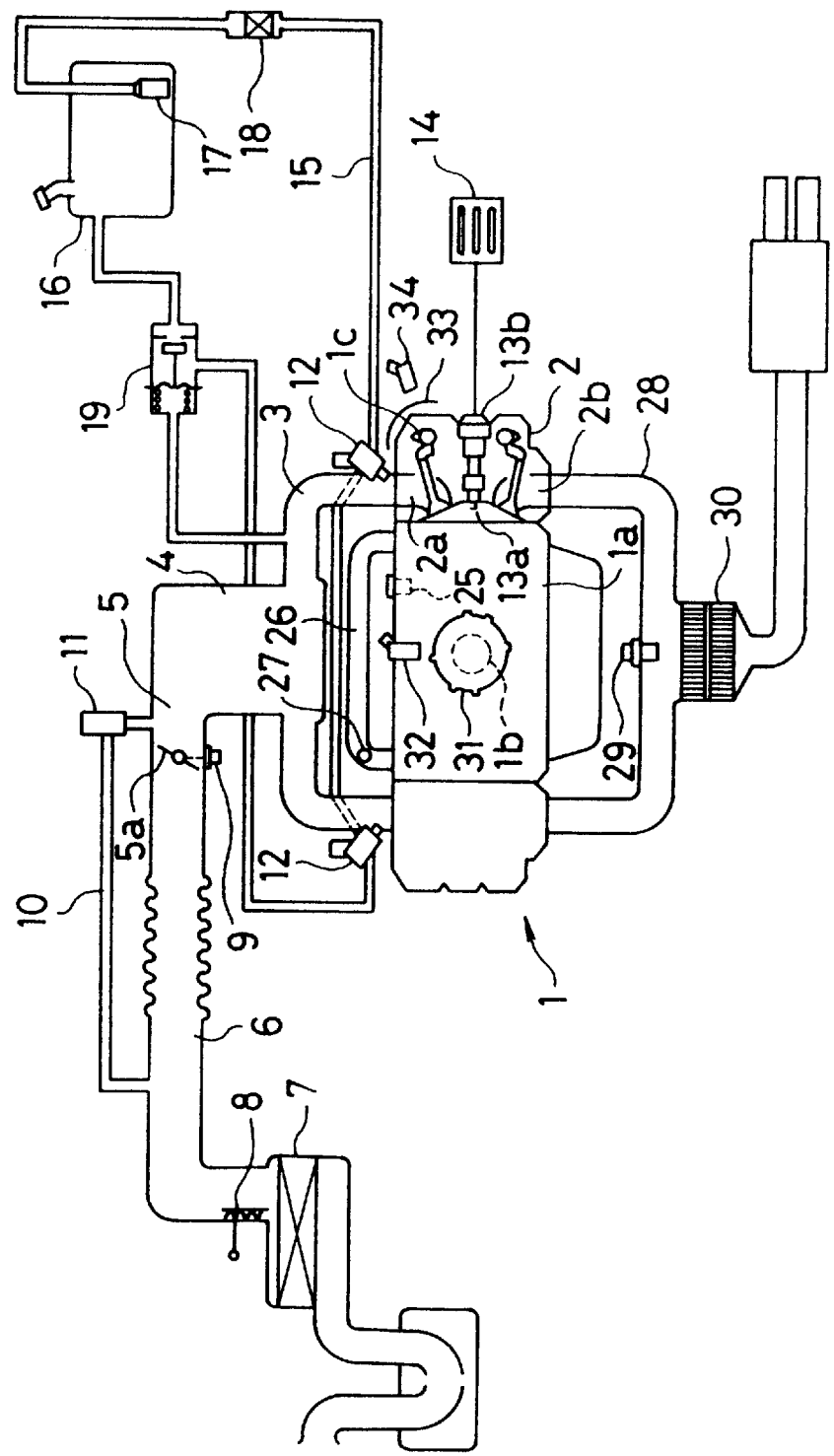

In FIG. 5, numeral 1 indicates an engine, and a four-cylinder horizontally-opposed engine is shown in the figure.

An intake manifold 3 communicates with the intake ports 2a formed at a cylinder head 2 of the engine 1, a throttle chamber 5 communicates with the intake manifold 3 through an air chamber 4, and an air cleaner 7 is mounted upstream of the throttle chamber 5 through an intake pipe 6.

In addition, an intake air quantity sensor (a hot-wire type intake air quantity sensor) 8 is incorporated immediately downstream of the air cleaner 7 of the intake pipe 6, and further, a throttle sensor 9 is incorporated in a throttle valve 5a provided in the throttle chamber 5.

An idling speed control (ISC) valve 11 is incorporated in a bypass passage 10 for communicating downstream with upstream of the throttle valve 5a, and injectors 12 are disposed immediately upstream of the intake ports 2a of the cylinders of the intake manifold 3.

Further, spark plugs 13 exposed at the ends with a combustion chamber, are mounted in the respective cylinders of the cylinder head 2, and igniters 14 are respectively connected to ignition coils 13b incorporated in the spark plugs 13a.

The injectors 12 communicate with a fuel tank 16 through a fuel supply passage 15. An in-tank type fuel pump 17 is provided in the fuel tank 16. Fuel from the fuel pump 17 is fed under pressure to the injectors 12 and a pressure regulator 19 through a fuel filter 18 incorporated in the fuel supply passage 15, returned from the pressure regulator 19 to the fuel tank 16, and regulated to a predetermined pressure.

A knock sensor 25 is mounted on the cylinder block 1a of the engine. A coolant temperature sensor 27 is disposed in a coolant passage 26 communicating with the right and left banks of the cylinder block 1a. Further, an $O_2$ sensor 29 is disposed in an exhaust manifold 28 communicating with an exhaust port 2b of the cylinder head 2. Numeral 30 denotes a catalytic converter.

A crank rotor 31 is secured on a crankshaft supported to the cylinder block 1a, and a crank angle sensor 32 which includes a magnetic sensor or an optical sensor such as an electromagnetic pickup or the like for detecting a crank angle is mounted in opposition to the outer periphery of the crank rotor 31 to constitute a rotation detecting means for detecting the rotation of the engine. Further, a cam rotor 33 is secured on a camshaft 1c of the cylinder head 2, and a cam angle sensor 34 for detecting a cylinder which includes a magnetic sensor or an optical sensor such as an electromagnetic pickup or the like is mounted in opposition to the outer periphery of the cam rotor 33.

Figure 6:
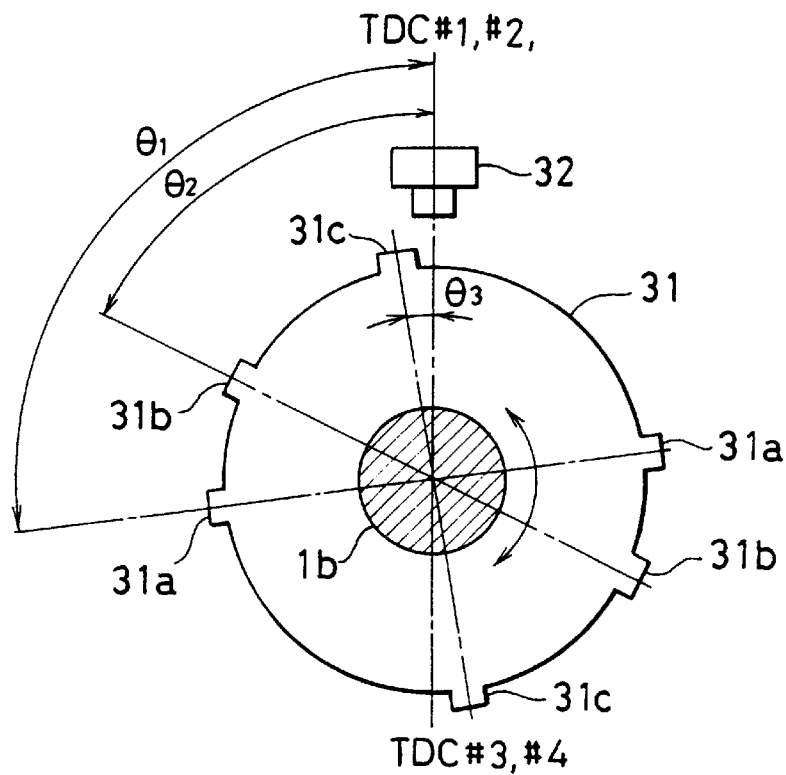

As shown in FIG. 6, the outer periphery of the crank rotor 31 is formed with projections 31a, 31b and 31c (which may be slits). The respective projections 31a, 31b and 31c are formed at positions θ1, θ2 and θ3 before the top dead center (BTDC) of compression in each cylinder, detection signals of the respective projections 31a, 31b and 31c output from the crank angle sensor 32 are waveform-shaped, input as θ1, θ2 and θ3 crank pulses to an electronic control unit (ECU) 41, which calculates an engine speed and obtains timings of an ignition timing control and a fuel injection control.

Figure 7:
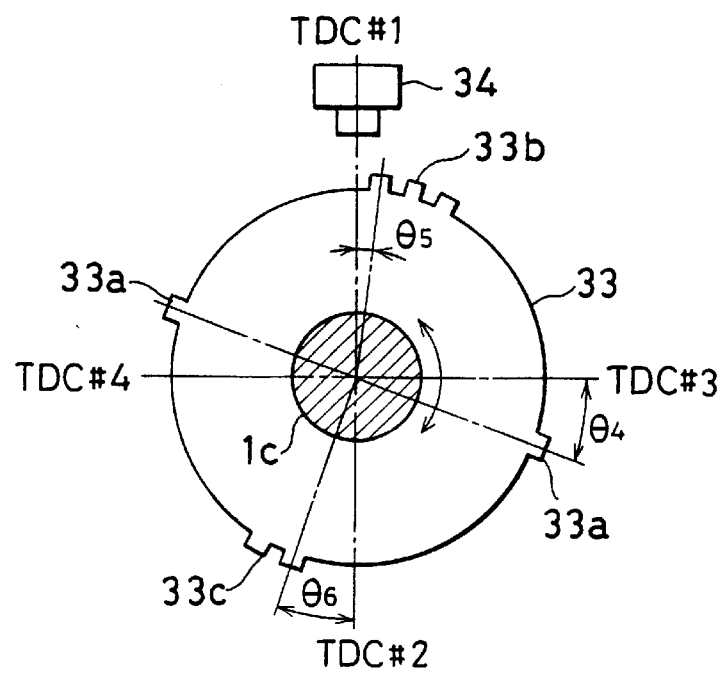
Figure 8:
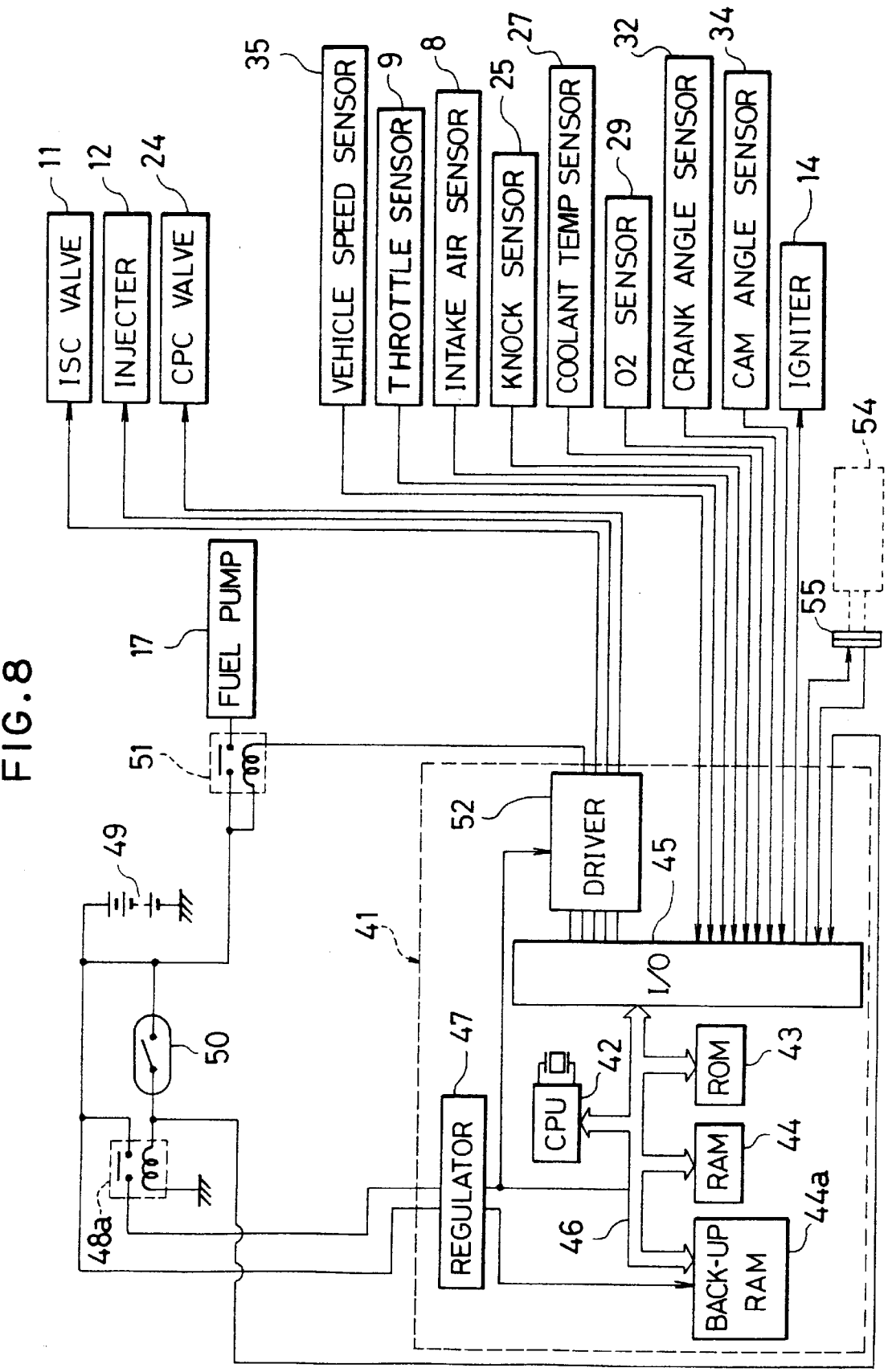

Also, as shown in FIG. 7, the outer periphery of the cam rotor 33 is formed with projections 33a, 33b and 33c for discriminating the cylinders. The projections 33a are respectively formed at the positions θ4 after the top dead centers (ATDC) of compression, of the cylinders #3 and #4. Besides, the projection group 33b is configured of three projections, the first one of which is formed at the position θ5 after the top dead center (ATDC) of compression, of the cylinder #1. Further, the projection group 33c is configured of two projections, the first one of which is formed at the position θ6 after the top dead center (ATDC) of compression, of the cylinder #2.

The projections 33a, 33b and 33c of the cam rotor 33 are detected by the cam angle sensor 34, waveform-shaped, applied to the ECU 41, and input as θ4, θ5 and θ6 cam pulses for discriminating the cylinders to the ECU 41.

As described above, as shown in FIG. 9, when the engine is operated, the cam pulses are generated at positions not superposed with the crank pulses, and the cylinders can be discriminated from the number of the cam pulses and the generating state.

By the way, in the illustrated embodiment, there are held θ1=97° CA, θ2=65° CA, θ3=10° CA, θ4=20° CA, θ5=5° CA, θ6=20° CA.

Meanwhile, numeral 41 designates an electronic control unit (ECU) which is configured of a microcomputer, etc. A CPU (central processing unit) 42, a ROM 43, a RAM 44, a back-up RAM 44a and an I/O interface 25, which constitute the electronic control unit (ECU) 41, are interconnected through bus lines 46, and a predetermined stabilized voltage is supplied from a constant-voltage circuit 47 thereto.

The constant-voltage circuit 47 is connected to a battery 49 through a relay contact of an ECU relay 48 and connected directly to the battery 49. When an ignition switch 50 connected between the relay coil of the ECU relay 48 and the battery 49 is turned on and the relay contact of the ECU relay 48 is closed, a controlling supply voltage is fed to the respective sections. When the ignition switch 50 is turned off, a back-up supply voltage is fed to the back-up RAM 44a.

Besides, the battery 49 is connected with the fuel pump 17 through the relay coil of a fuel pump relay 51 and the relay contact of the fuel pump relay 51.

The intake air quantity sensor 8, the throttle sensor 9, the knock sensor 25, the coolant temperature sensor 27, the $O_2$ sensor 29, the crank angle sensor 32, the cam angle sensor 34, a vehicle speed sensor 35 and the like are connected to the input ports of the I/O interface 45, and the battery 49 is connected to monitor the battery voltage.

The igniters 14 are connected to the output ports of the I/O interface 45. Further, the ISC valve 11, the injectors 12, the relay coil of the fuel pump relay 51 and an electronic control system (ECS) lamp 53 arranged on an instrument panel (not shown) are connected through a driving circuit 52.

A control program, various control fixed data, etc. are stored in the ROM 43. Besides, the output signals of the sensors and switches subjected to data processing and data arithmetically processed by the CPU 42 are stored in the RAM 44, a supply voltage is always fed to the back-up RAM 44a irrespective of the ignition switch 50, the stored content is not erased even if the engine is stopped by turning off the ignition switch 50, and a trouble code corresponding to the trouble position detected by a self-diagnosing function and the like are stored.

The trouble data stored in the back-up RAM 44a can be read out by connecting a serial monitor 54 through a connector 55 to the ECU 41. The serial monitor 54 is described in detail in the official gazette of Japanese Patent Application Laid-open No. 73131/1990 filed previously by the same assignee as the present invention.

The CPU 42 calculates a fuel injection quantity, an ignition timing, a duty ratio of a drive signal of the ISC valve 11 and the like according to the control program stored in the ROM 43, variously controls an air-fuel ratio, an ignition timing, an idling speed and the like, and individually judges a misfire of each cylinder #n (n=1 to 4).

Next, misfire detecting steps in the electronic control unit (ECU) 41 will be described in conjunction with the flow charts of FIGS. 1 to 4.

Figure 2:
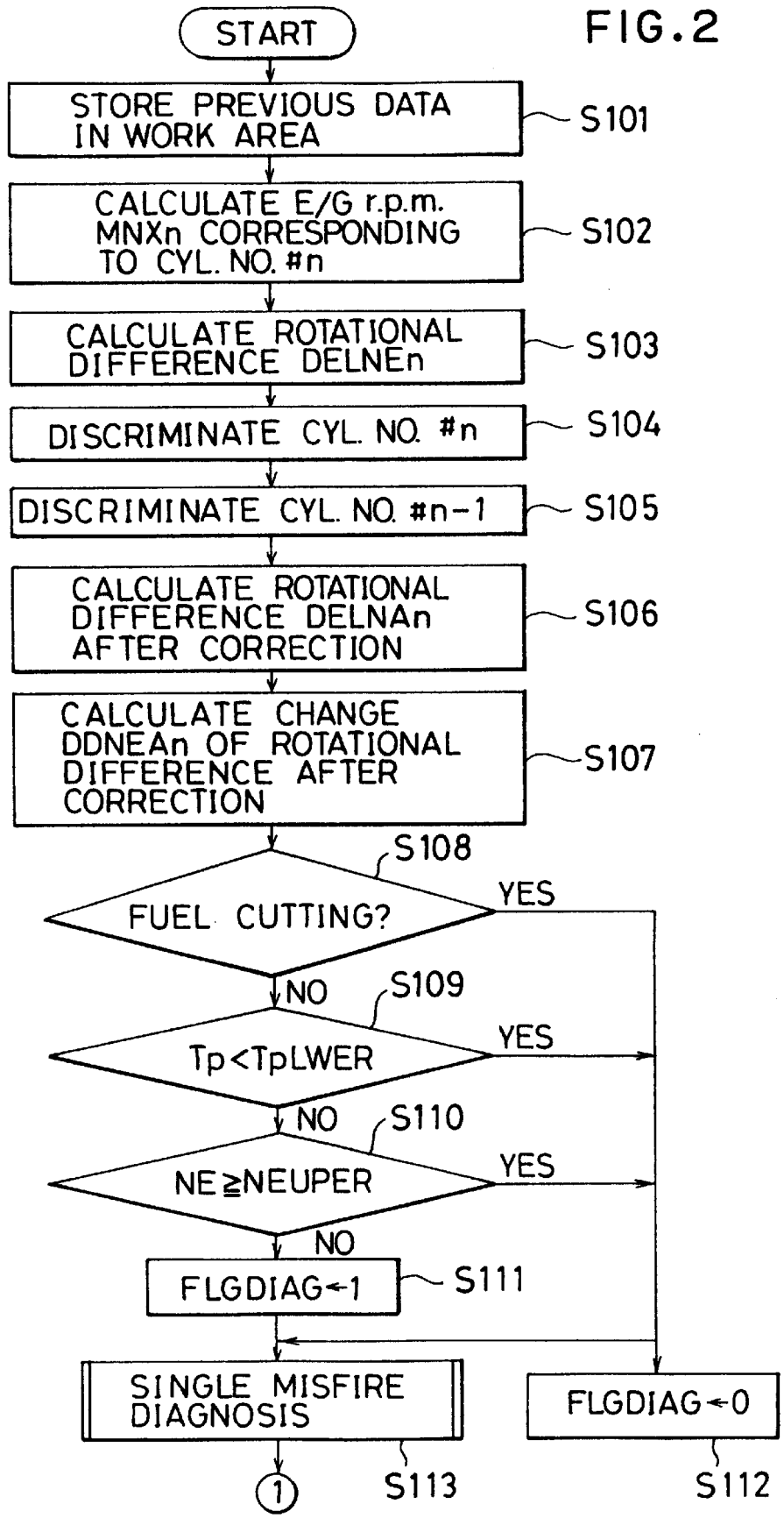
Figure 3:
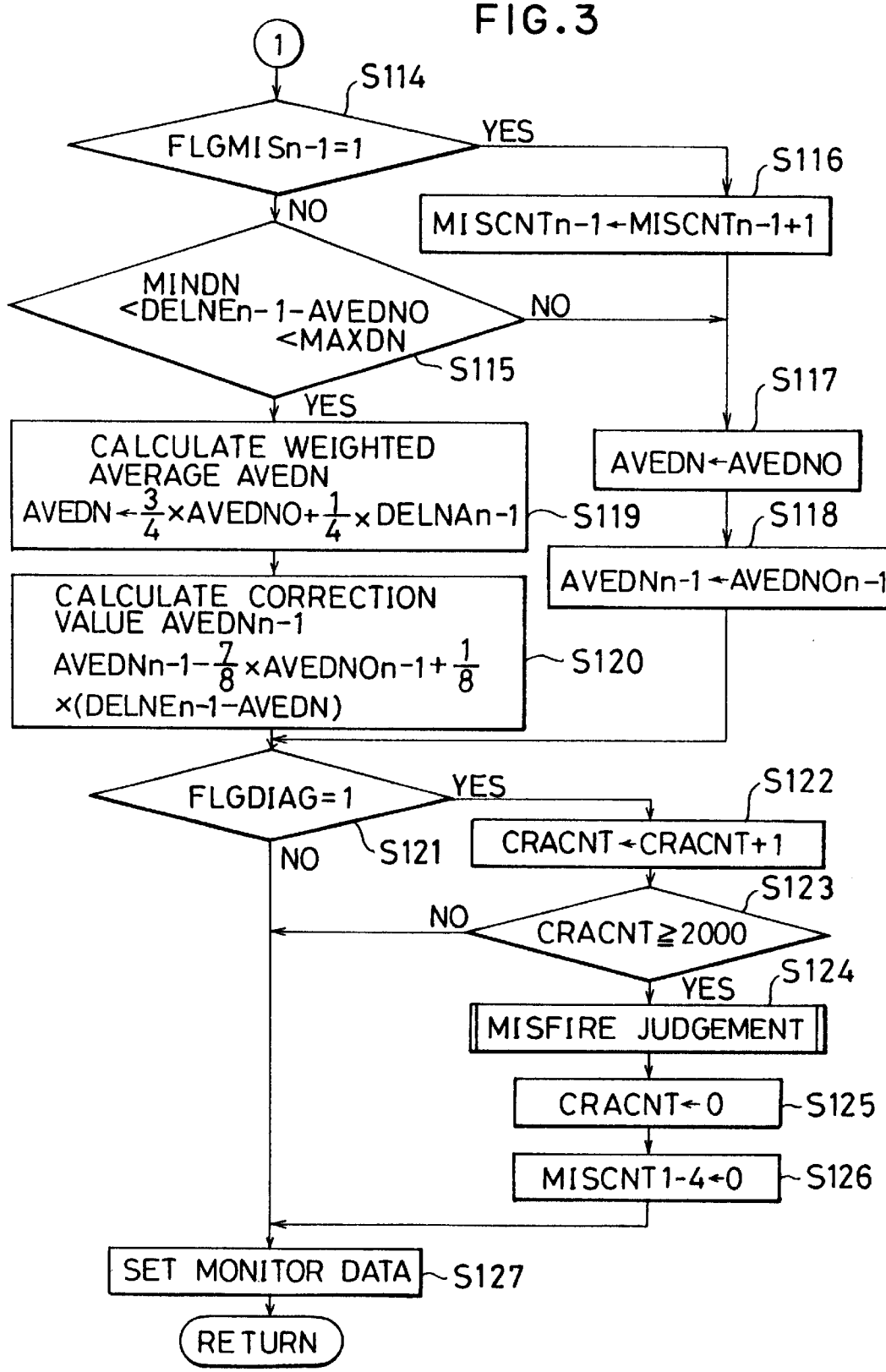

FIGS. 2 and 3 are flow charts showing a misfire diagnosis routine to be interrupted and executed in synchronization with a θ3 crank pulse from the crank angle sensor 32. At a step (hereinbelow, abbreviated to "S") 101, data obtained at the time of executing the previous routine are stored in a work area. At S102, an engine r.p.m. $MNX_n$ corresponding to cylinder #n (n=1, 3, 2, 4) is calculated from an input interval time between the θ2 and θ3 crank pulses and a holding angle (θ2–θ3) of the crank rotor 31 indicating the θ2 and the θ3 crank pulses, for example, in a range of 150 r.p.m. or more by considering a misfire in a low speed range of the engine.

Then, the control flow proceeds to S103, the engine speed $MNX_{n-1}$ corresponding to Xn–1 cylinder before one combustion stroke is subtracted from the engine speed $MNX_n$ corresponding to the cylinder No. #n calculated at the S102, and a rotational difference $DELNE_n$ is calculated ($DELNE_n$ from $MNX_n - MNX_{n-1}$).

Subsequently, at S104, the cylinder No. #n of the combustion stroke at this time is discriminated from n=1, 3, 2, 4 based on the crank pulse and the cam pulse output from the crank angle sensor 32 and the cam angle sensor 34, and at S105, the cylinder No. #n–1 before one combustion stroke is discriminated.

Figure 9:
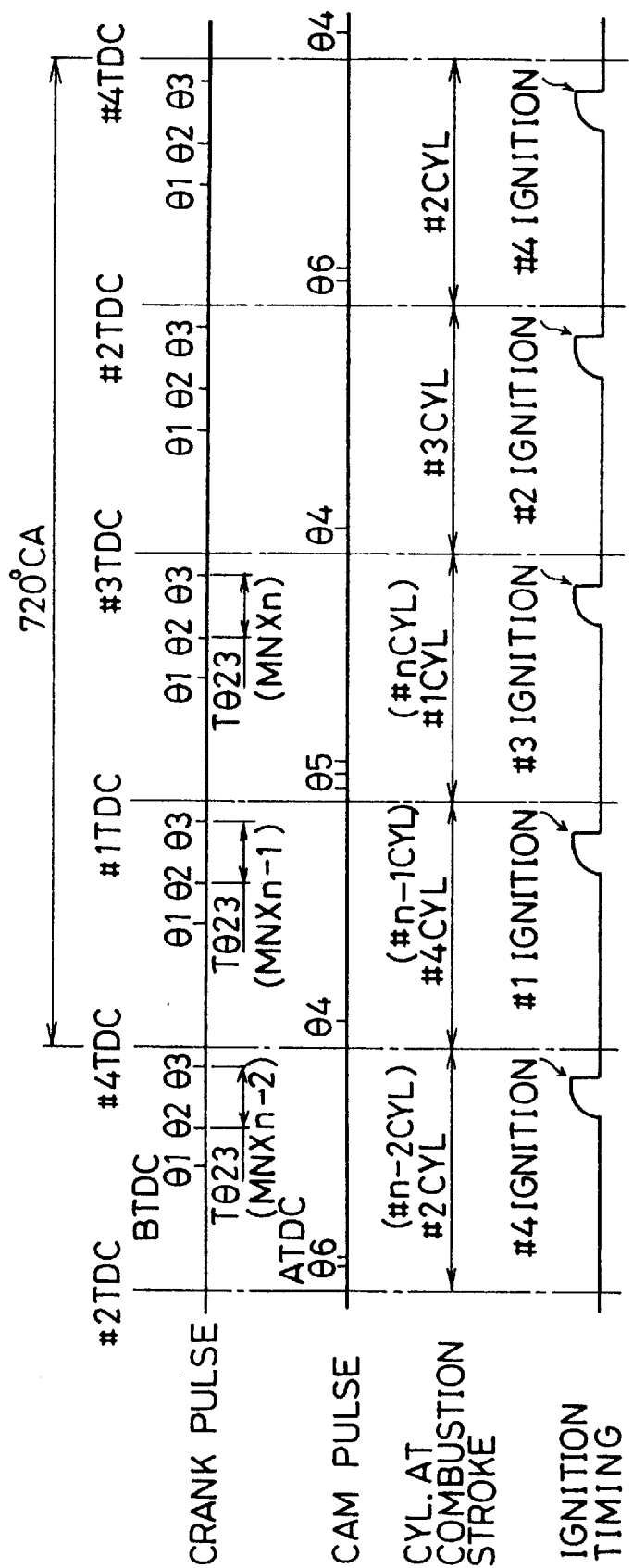

As shown, for example, in FIG. 9, in a case where the crank pulse is input from the crank angle sensor 32 after the θ5 cam pulse is input from the cam angle sensor 34, the crank pulse is discriminated to be a signal indicating the crank angle of the cylinder No. #3. When the θ4 cam pulse is input after the θ5 cam pulse, the following crank pulse is discriminated to be a signal indicating the crank angle of the cylinder #2.

Similarly, the crank pulse after the θ6 cam pulse is input, indicates the crank angle of the cylinder No. #4. When the θ4 cam pulse is input after the θ6 cam pulse, the following crank pulse is discriminated to be a signal indicating the crank angle of the cylinder No. #1.

Further, the crank pulse to be input from the crank angle sensor 32 after the cam pulse is input from the cam angle sensor 34 is discriminated to indicate a reference crank angle (θ1) of the cylinder.

In the embodiment, in a case where the ignition order is #1 to #3 to #2 to #4 and a misfire diagnosis routine is now executed in synchronization with the θ3 crank pulse of the BTDC θ3 of the cylinder No. #3, the combustion stroke cylinder No. #n is the cylinder No. #1, the cylinder No. #n−1 before one combustion stroke is the cylinder No. #4, and the cylinder #n−2 before two combustion strokes is the cylinder No. #2.

In this case, the detected position of the crank angle by the crank angle sensor 32 includes an allowable error in the manufacture of the positions and shape of the projections 31a, 31b and 31c of the crank rotor 31 and an allowable error in the mounting position of the crank angle sensor 32 on the engine 1 in each engine.

Therefore, the rotational difference $DELNE_n$ calculated based on the crank pulse from the crank angle sensor 32 includes an irregularity due to the errors. Particularly, when the engine is rotated at a high speed, as shown in FIG. 10, a large variation in the engine speed apparently uniformly occurs.

As a result, the S105 proceeds to S106, the rotational difference correction value $AVEDNO_n$ of the cylinder No. #n upto the previous time calculated by statistically processing the rotational difference $DELNE_n$ is subtracted from the rotational difference $DELNE_n$ calculated at the S103, calculated as a rotational difference $DELNE_n$ after correction ($DELNE_n$ from $DELNE_n - AVEDNO_n$). Thus, influence of the allowable error in manufacture of the position and the shape of the projections 31a, 31b and 31c of the crank rotor 31, and the allowable error in mounting position of the crank angle sensor 32 on the engine 1 is eliminated from the rotational difference $DELNE_n$ before the correction shown in FIG. 10, and, as shown in FIG. 11, an accurate rotational difference between the engine speed corresponding to the cylinder No. #n and the engine speed corresponding to the cylinder No. #n−1 before one combustion stroke is obtained.

Figure 10:
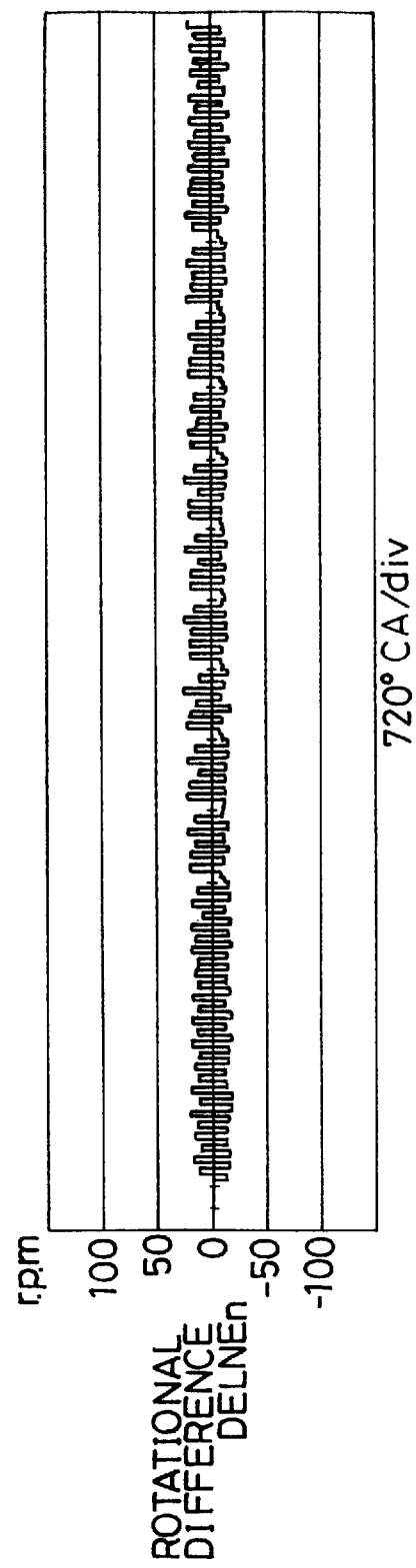
Figure 11:
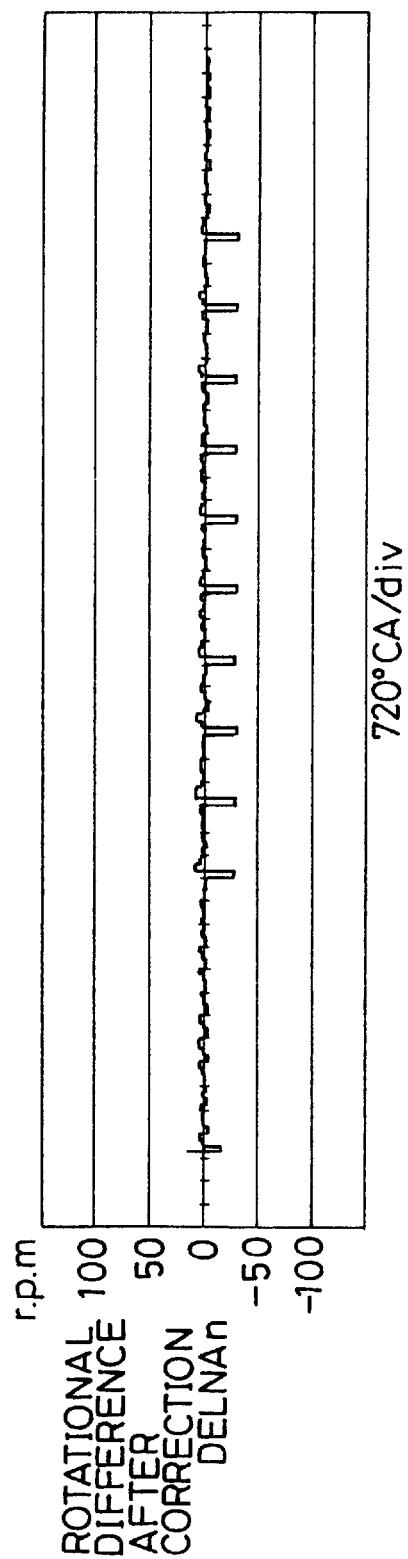
Figure 12:
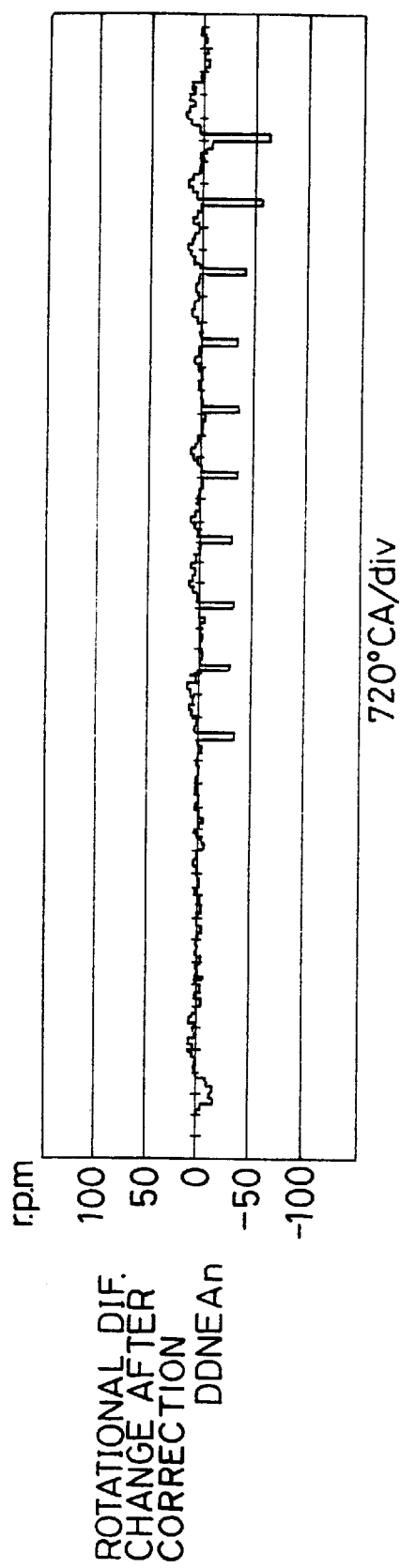

In FIGS. 10, 11 and 12 (to be described later), a rotational difference data calculated by the ECU 41 from 50 revolutions of one division of a vertical axis and 720° CA of one division (1 div) of a lateral axis, is indicated.

As described above, in a case where the misfire diagnosis routine is executed in synchronization with the BTDC θ3 crank pulse of the cylinder No. #3, the cylinder No. #4 as the cylinder No. #n−1 before one combustion stroke is to be diagnosed for a misfire. The first value is obtained by subtracting the speed MNXZ (=$MNX_{n-2}$) of the cylinder No. #2 (the cylinder No. #n−2) before two combustion stroke based on an input interval time between the BTDC θ2 and θ3 crank pulses of the cylinder No. #4 from the speed MNX4 (=$MNX_{n-1}$) of the cylinder No. #4 (cylinder No. #n−1) before one combustion stroke calculated based on an input interval time between the BTDC θ2 and θ3 crank pulses of the cylinder No. #1, and the second, value is obtained by subtracting the speed MNX4 based on an input interval time between the BTDC θ2 and θ3 crank pulses of the cylinder No. #1 from the speed MNX1 (=$MNX_n$) based on an input interval time between the BTDC θ2 and θ3 crank pulses of the cylinder No. #3. A first rotational difference is obtained by correcting and statistically processing the first value, and a second rotational difference is obtained by correcting and statistically processing the second value. Therefore, the misfire diagnosis of the cylinder No. #4 (the cylinder No. #n−1) is executed at the next process described hereinafter by the difference between the first and the second difference.

Then, the S106 proceeds to S107, and a difference between the rotational difference $DELNA_n$ corresponding to the cylinder No. #n after correction and the rotational difference $DELNA_{n-1}$ corresponding to the cylinder No. #n−1 after correction calculated at the time of executing the previous routine is calculated as a rotational difference change $DDNEA_n$ after correction ($DDNEA_n$ from $DELNA_n - DELNA_{n-1}$).

More specifically, when an intermittent rotation change such as a snatch occurs in the engine, it is difficult to discriminate an accurate misfire merely by comparing the rotational difference $DELNA_n$ after correction with a predetermined misfire judgement level.

Therefore, an accurate misfire can be detected by collecting the rotational difference change after correction corresponding to the cylinder before and after the variation of the r.p.m. The collection mentioned above is eliminated (influence of engine speed change due to a snatch and the like).

Subsequently, the S107 proceeds to S108 and following steps, and whether misfire diagnosis conditions are satisfied or not is discriminated in S108, S109 and S110. That is, at the S108, whether fuel is cutting or not is checked, at the S109, whether basic fuel injection pulse width Tp is smaller than a set value TpLWER or not is checked. At the S110, whether the engine speed NE is more than a set speed NEUPER or not is checked.

In a case where fuel is not cut and Tp≧TpLWER and NE<NEUPER are satisfied through the S108, S109 and S110, the diagnosis conditions are satisfied, and hence at S111, a diagnosis allowance flag FLGDIAG is set (FLGDIAG to "1"). On the other hand, when fuel is cutting at the S108, Tp<TpLWER is satisfied at the S109 or NE≧NEUPER is satisfied at the S110, the diagnosis conditions are not satisfied, and hence the respective steps branch to S112, and the diagnosis allowance flag FLGDIAG is cleared (FLGDIAG to "0")

In a case where the S111 or S112 proceeds to S113, a single misfire diagnosis subroutine to be described later is executed, and at S114, a value of misfire flag $FLGMIS_{n-1}$ of the cylinder No. #n−1 before one combustion stroke is referred.

When a misfire is discriminated in the single misfire diagnosis at the S113, $FLGMIS_{n-1}$=1 is set. On the other hand, when $FLGMIS_{n-1}$=0, that is, a misfire does not occur in the cylinder No. #n−1 to be diagnosed for a misfire, the S114 proceeds to S115, and whether a difference Δ (=$DELNE_{n-1}$−AVEDNO) between the rotational difference $DELNE_{n-1}$ of the cylinder No. #n−1 and the rotational difference weighed average value AVEDNO of all the cylinders up to the previous time (=$DELNE_{n-1}$−AVEDNO) falls within a predetermined set range between upper and lower set values MINDN and MAXDN (MINDN<MAXDN) or not is discriminated.

At the S115, when MINDN<Δ<MAXDN is satisfied and the difference falls within the set range, change of the rotational difference $DELNE_n$ is discriminated by an error of the crank rotor 31 or the crank angle sensor 32. At S119, S120, the rotational difference $DELNE_{n-1}$ is statistically processed, and proceeds to S121.

More specifically, at the S119, in order to correct the rotational difference change due to the error, new entire cylinder rotational difference weighed average value AVEDN is calculated from the rotational difference weighed average value AVEDNO of all the cylinders up to the previous time and the rotational difference $DELNA_{n-1}$ after correction corresponding to the cylinder No. #n−1 (AVEDN from (¾)×AVEDNOLD+(¼)×DELNA$_{n-1}$). At the S120, new rotational difference correction value AVEDN$_{n-1}$ of the cylinder No. #n−1 is calculated from the difference between the new entire cylinder rotational difference weighed average value AVEDN and the rotational difference DELNE$_{n-1}$ of the cylinder No. #n−1 and the rotational difference correction value AVEDNO$_{n-1}$ of the cylinder NO. #n−1 up to the previous time (AVEDN$_{n-1}$ from (⅞)×AVEDNO$_{n-1}$+ (⅛)×(DELNE$_{n-1}$−AVEDN)).

On the other hand, at the S114, in a case where FLGMIS$_{n-1}$=1, i.e., a misfire occurs in the cylinder No. #n−1, at the S116, the counted value MISCNT$_{n-1}$ of the number of misfires is counted up, and proceeds to the S117.

In a case where, at the S115, Δ≦MINDN or Δ≧MAXDN is satisfied, it means the variation in the rotational difference DELNE$_{n-1}$ irrespective of the error of the crank rotor 31 or the crank angle sensor 32, a variation in the rotational difference DELNE$_{n-1}$ due to another cause such as a snatch, acceleration/deceleration or the like is discriminated, and proceeds to the S117.

At the S117, the entire cylinder rotational difference weighed average value AVEDNO up to the previous time is set to the entire cylinder rotational difference weighed average value AVEDN at this time (AVEDN from AVEDNO), at the S118, the rotational difference AVEDNO$_{n-1}$ of the cylinder No. #n−1 up to the previous time is set to the new rotational difference correction value AVEDN$_{n-1}$ of the cylinder No. #n−1, (AVEDN$_{n-1}$ from AVEDNO$_{n-1}$) and proceeds to S121.

In a case where the S118 or S120 proceeds to the S121, the value of diagnosis allowance flag FLGDIAG is referred. When FLGDIAG=0, the control flow jumps to S127, and when FLGDIAG=1, at S122, a counted value CRACNT to be counted at each execution of a misfire diagnosis is counted up (CRACNT to CRACNT+1), and at step S123, whether the counted value CRACNT reaches 2000 or not is discriminated.

As described above, since the misfire detection routine is executed at each input of θ3 crank pulse, i.e., each ½ revolution of the engine, the counted value CRACNT=2000 indicates 1000 r.p.m. of the engine.

At the S123, in a case where CRACNT<2000 is satisfied, the control flow branches to S127. When CRACNT≧2000 is satisfied, at the S124, a misfire judging subroutine to be described later is executed. When at the S125, S126, the counted value CRACNT, the counted value MISCNT1–4 of the number of misfires for all the cylinders are cleared (CRACNT to "0", MISCNT1–4 to "0"), the control flow proceeds to the S127. At the S127, the data of the rotational difference DELNE$_n$ calculated this time, the rotational difference DELNA$_n$ after correction, the rotational difference change DDNEA$_n$ after correction, the entire cylinder rotational difference weighed average value AVEDN and the rotational difference correction value AVEDN$_{n-1}$ of the cylinder No. #n−1 are set in the RAM 44 as data to be monitored, and the routine is completed.

Then, subroutines of a single misfire diagnosis of the S113 and misfire judgement of the S124 in the above-described misfire diagnosis routine will be described.

Figure 1:
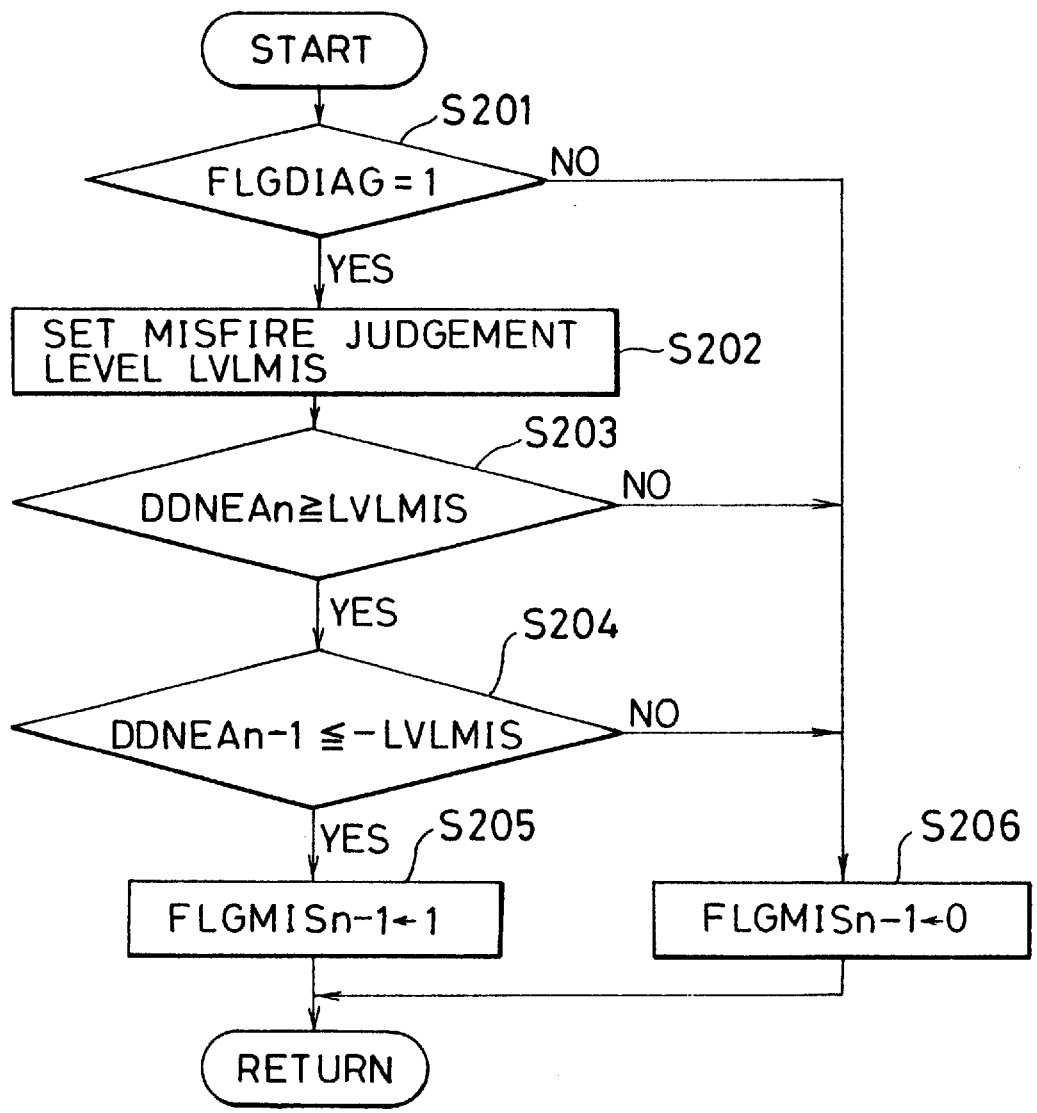

First, in the subroutine of the single misfire diagnosis shown in FIG. 1, in case where the value of a diagnosis allowance flag FLGDIAG is referred at S201 and FLGDIAG=0 is satisfied, at S206, a misfire flag FLGMIS$_{n-1}$ of the cylinder No. #n−1 before one combustion stroke is cleared (FLGMIS $_{n-1}$ to "0"), the routine is completed, and when FLGDIAG=1, the control flow proceeds to S202.

At the S202, with the engine speed NE and the basic fuel injection pulse width Tp as parameters, a misfire discrimination map is referred with an interpolation calculation, a misfire judgement level LVLMIS is set, and the control flow proceeds to S203 and following steps.

Figure 13:
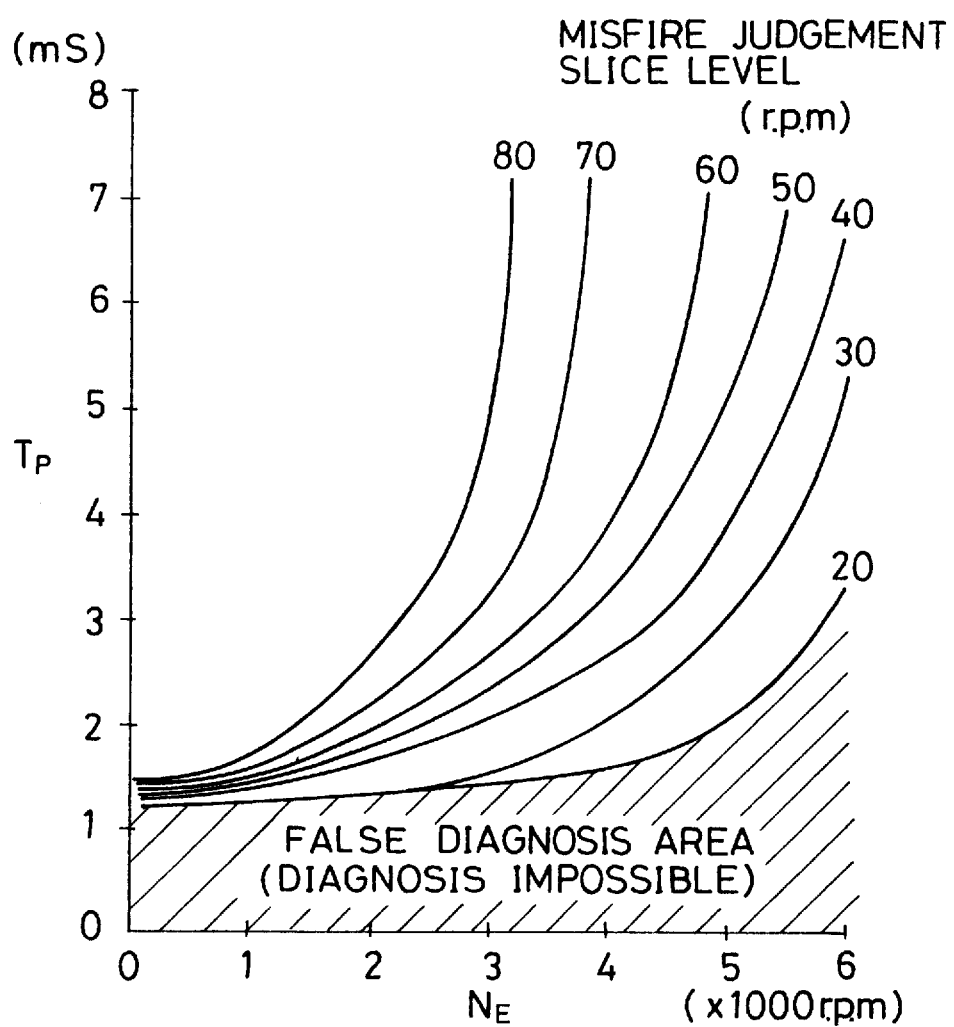
Figure 14:
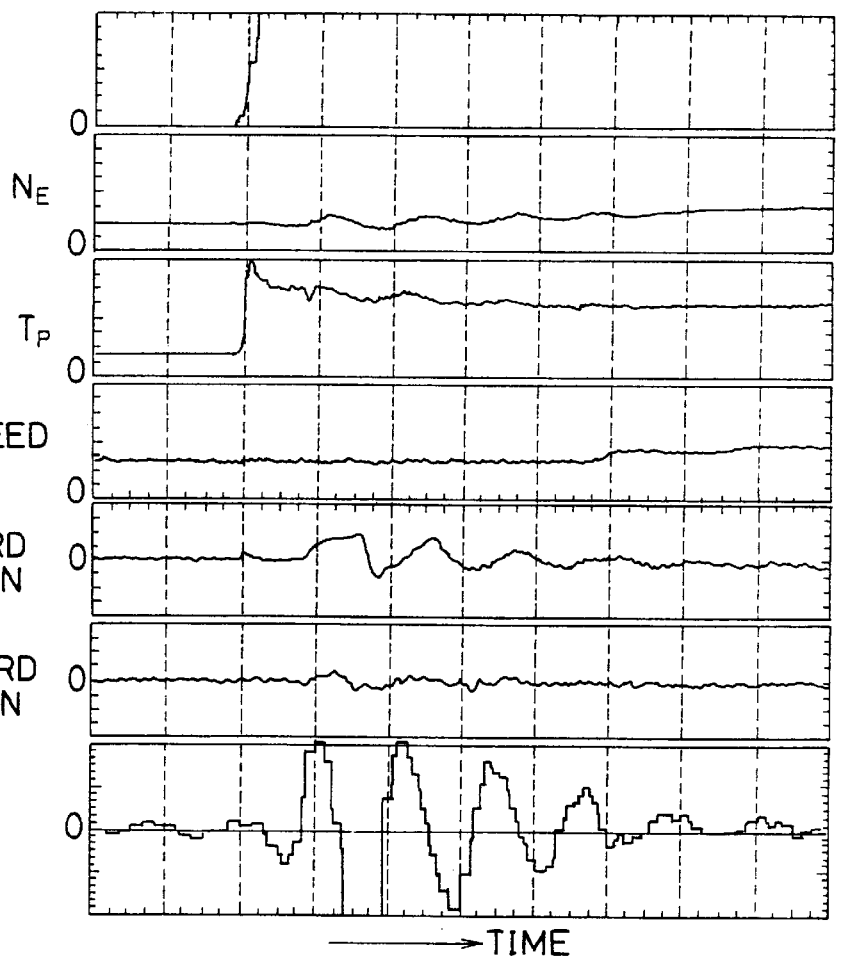

The misfire judgement level LVLMIS is stored as a map in the ROM 43 as a value, as shown in FIG. 13, in which a slice level is raised as a load is increased when a basic fuel injection pulse width Tp is increased, and an engine low load range having a small basic fuel injection pulse width Tp is in a mistaken diagnosis area in which diagnosis is impossible.

Then, when the S202 proceeds to the S203, the rotational difference change DDNEA$_n$ after correction corresponding to the cylinder No. #n and the rotational difference change DDNEA$_{n-1}$ after correction corresponding to the cylinder No. #n read out from the RAM 44 are compared with the misfire judgement level LVLMIS set at the S202, at the S203, S204, and the misfire is judged.

First, at the S203, the misfire judgement level LVLMIS is compared with the rotational difference change DDNEA$_n$ after correction corresponding to the cylinder No. #n, and when DDNEA$_n$<LVLMIS is satisfied, the routine is completed through the above-described S206. When DDNEA$_n$≧LVLMIS is satisfied, at the S204, negative misfire judgement level (−LVLMIS) is compared with the rotational difference change DDNEA$_{n-1}$ after correction corresponding to the cylinder No. #n−1.

At the S204, when DDNEA$_{n-1}$>−LVLMIS is satisfied, no misfire is judged, the control flow branches to the S206.

When DDNEA$_{n-1}$≦−LVLMIS is satisfied, misfire of the cylinder No. #n−1 is judged, the control flow proceeds to the S205, the misfire flag FLGMIS$_{n-1}$ is set (FLGMIS$_{n-1}$ to "1"), and the routine is completed.

More specifically, only when the rotational difference after correction is increased over the misfire judgement level LVLMIS at the time that the detected cylinder passes from the cylinder No. #n−1 to the cylinder No. #n after the rotational difference after correction is decreased below the misfire judgement level LVLMIS at the time that the detected cylinder passes from the cylinder No. #n−2 to the cylinder No. #n−1, the misfire of the cylinder No. #n−1 is judged, and hence as shown in FIGS. 14A–14E, it is distinguished from engine rotation change such as a snatch varying continuously at the rotational difference for a predetermined period, and hence the misfire can be accurately detected.

Figure 4:
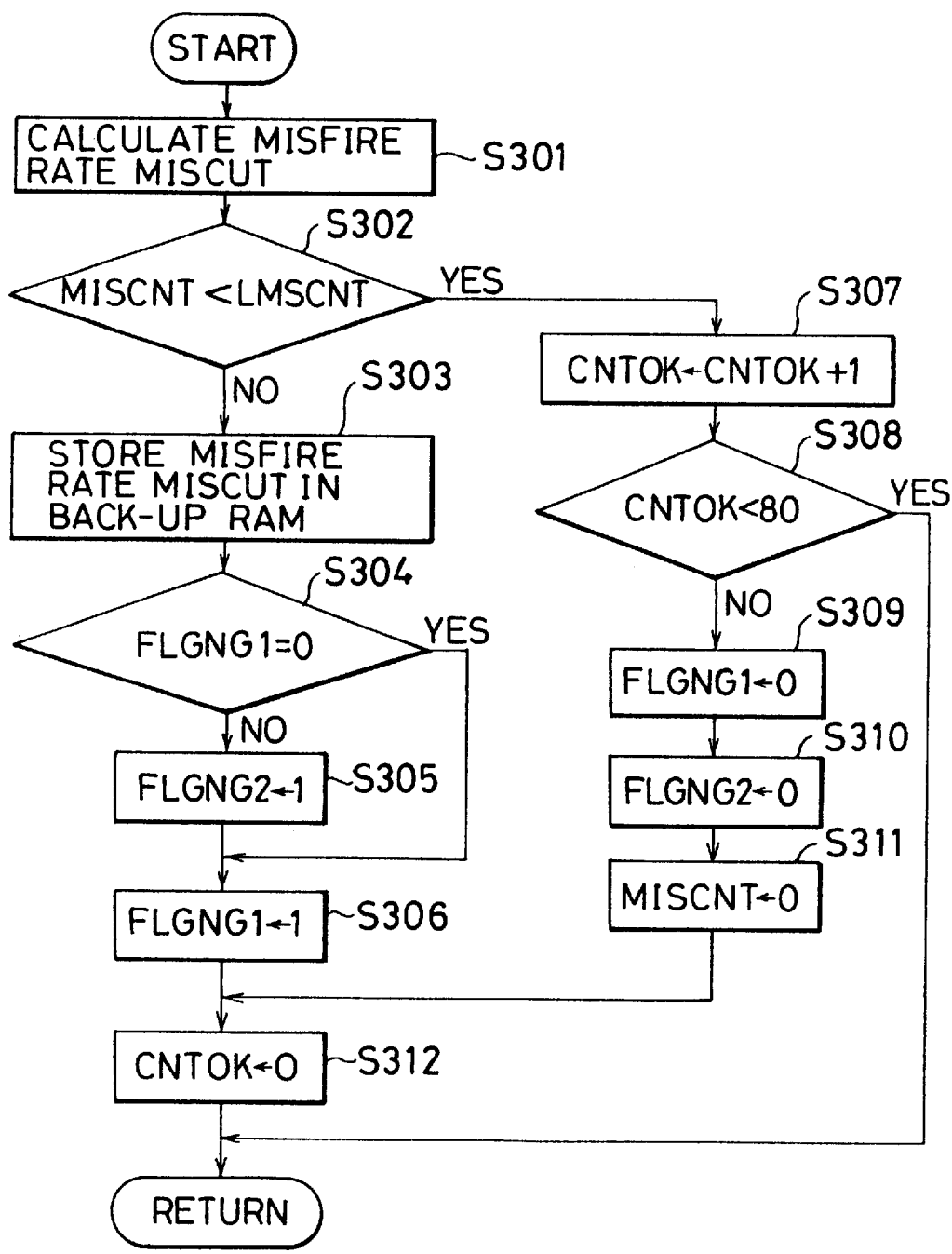

Further, in the subroutine of the misfire judgement shown in FIG. 4, at S301, total misfire count ΣMISCNT$_n$ (n=1 to 4) of four cylinders is divided by the value CRACNT (=2000) counted at the previous S122, and a misfire rate MISCNT (%) per 1000 revolutions of the engine is calculated (MISCNT to ΣMISCNT$_n$/CRACNT×100).

Subsequently, the control flow proceeds to S302, and whether the misfire rate MISCNT calculated at the S301 is smaller than a set value LMSCNT or not is judged. The set value LMSCNT is a constant previously stored in ROM 43 with the engine speed NE and the basic fuel injection pulse width Tp as parameters.

As a result of the judgement at the S302, when MISCNT≧LMSCNT is satisfied, at step S303, the misfire rate MISCNT is stored in a predetermined address of the back-up RAM 44a, and at S304, whether first misfire judgement NG flag FLGNG1 stored in a predetermined address of the back-up RAM 44a is set or not is checked.

At the S304, in a case where the first misfire judgement NG flag FLGNG1 is not yet set and FLGNG1="0", the S304 is jumped to S306. When the first misfire judgement NG flag FLGNG1 is set and FLGNG1="1", the S304 proceeds to S305, second misfire judgement NG flag FLGNG2 stored in a predetermined address of the back-up RAM 44a is set (FLGNG2 to "1"), the ECS lamp 53 is lit or flashed to generate an alarm to a user, and the control flow proceeds to S306.

At the S306, the first misfire judgement NG flag FLGNG1 is set (FLGNG1 to "1"), at S312, a misfire OK counter for counting judgements of no abnormality is cleared, (CNTOK to "0") and the routine is completed.

More specifically, in order to avoid an erroneous diagnosis due to noise or the like, even if the misfire rate MISCNT becomes the set value LMSCNT or more at the first judgement, an alarm is not immediately generated, but in a case where the misfire rate MISCNT continuously becomes the set value LMSCNT or more at the second judgement, the cylinder is judged to be abnormal, and an alarm is generated.

Incidentally, at this time, trouble data of the misfire cylinder are stored in the back-up RAM 44a, and when a trouble shooting is executed by a dealer, the trouble data stored in the back-up RAM 44a is read out by a flashing code of the monitoring lamp of the ECU 41 or the serial monitor 54. After the misfire cylinder is judged and repaired, the trouble data in the back-up RAM 44a is cleared through the serial monitor 54.

On the other hand, in a case where MISCNT<LMSCNT is satisfied at the S302, no abnormality is judged. At S307, when a misfire OK counter CNTOK is incremented (CNTOK to CNTOK+1), at S308, whether the value of the misfire OK counter CNTOK exceeds 80 times or not is judged. When CNTOK<80, the routine is completed. When CNTOK≧80, at S309, S310, S311, first misfire judgement NG flag FLGNG1, second misfire judgement NG flag FLGNG2 and the misfire rate MISCNT are cleared (FLGNG1 to "0", FLGNG2 to "0), MISCNT to "0"), at the S312, the misfire OK counter CNTOK is cleared (CNTOK to "0"), and the routine is completed.

As described above, according to the present invention, a first engine r.p.m. (MNXn) of a first cylinder number (#n) at a present combustion stroke, (S102) is sensed, a second engine r.p.m. (MNXn-1) of a second cylinder number (#n-1) at a previous combustion stroke is detected, (S102), a rotational difference (DELNEn) is calculated by subtracting said second engine r.p.m. (MNXn-1) from said first engine r.p.m. (MNXn); (S103), a rotational difference ((DELNAn) after correction is computed by comparing said rotational difference (DELNEn) with a reference value (AVEDNOn) corresponding to an engine operating condition; (S406), a difference change (DDNEAn) is derived by subtracting a previous rotational difference (DELNAn-1) from the rotational difference (DELNAn); (S107) and a misfire condition for said previous cylinder (#n-1) is judged when said difference change (DDNEAn) is larger than a predetermined misfire level (LVLMIS) and also when a previous difference change (DENEAn-1) is smaller than a minus value of the predetermined misfire level (-LVLMIS). (S203,S204). Therefore, the invention achieves excellent effects that the misfire of the cylinder can be always accurately detected without influence of the variation in the rotation of the engine due to a cause except the misfire.

Figure 15:
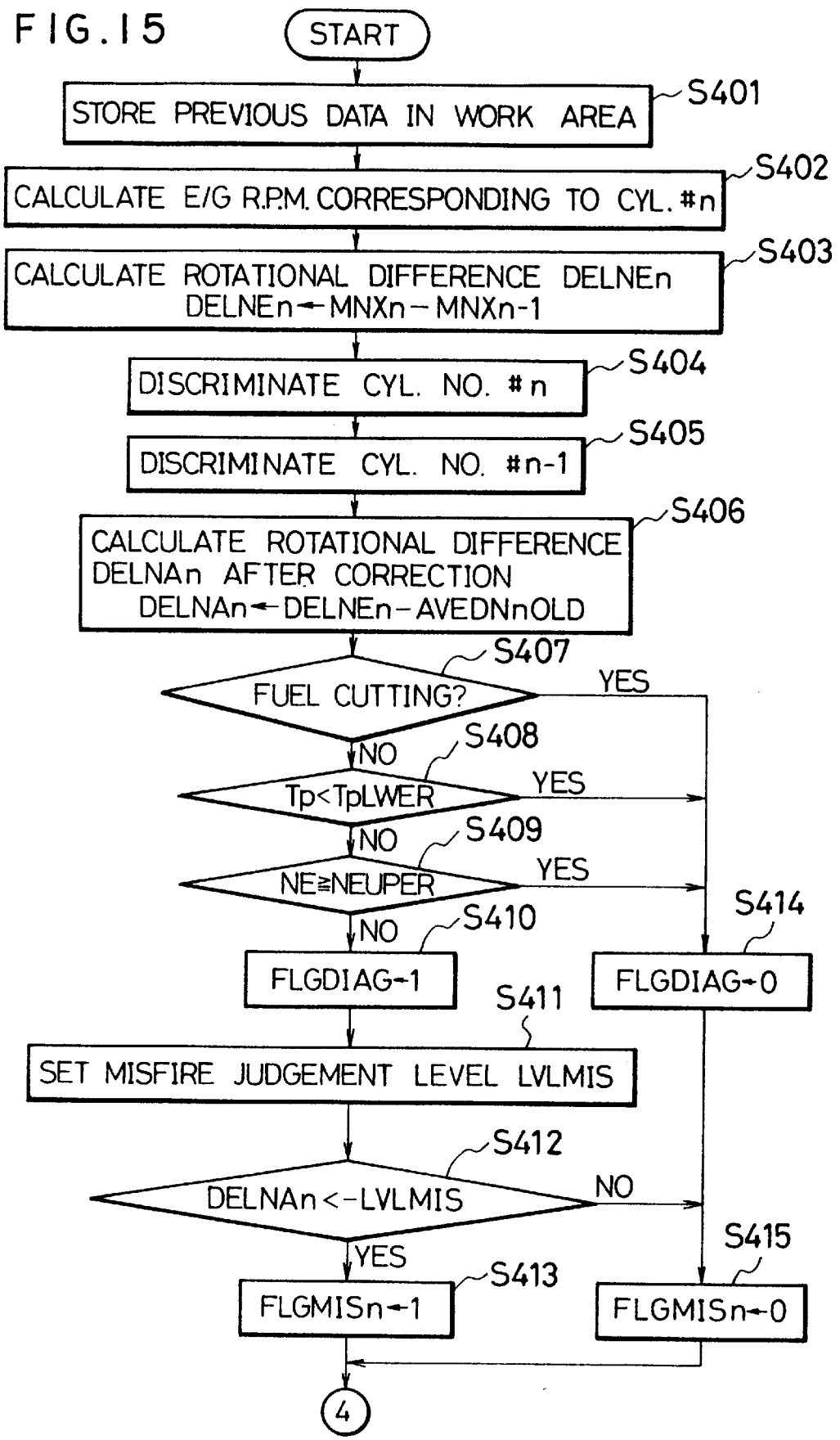
Figure 16:
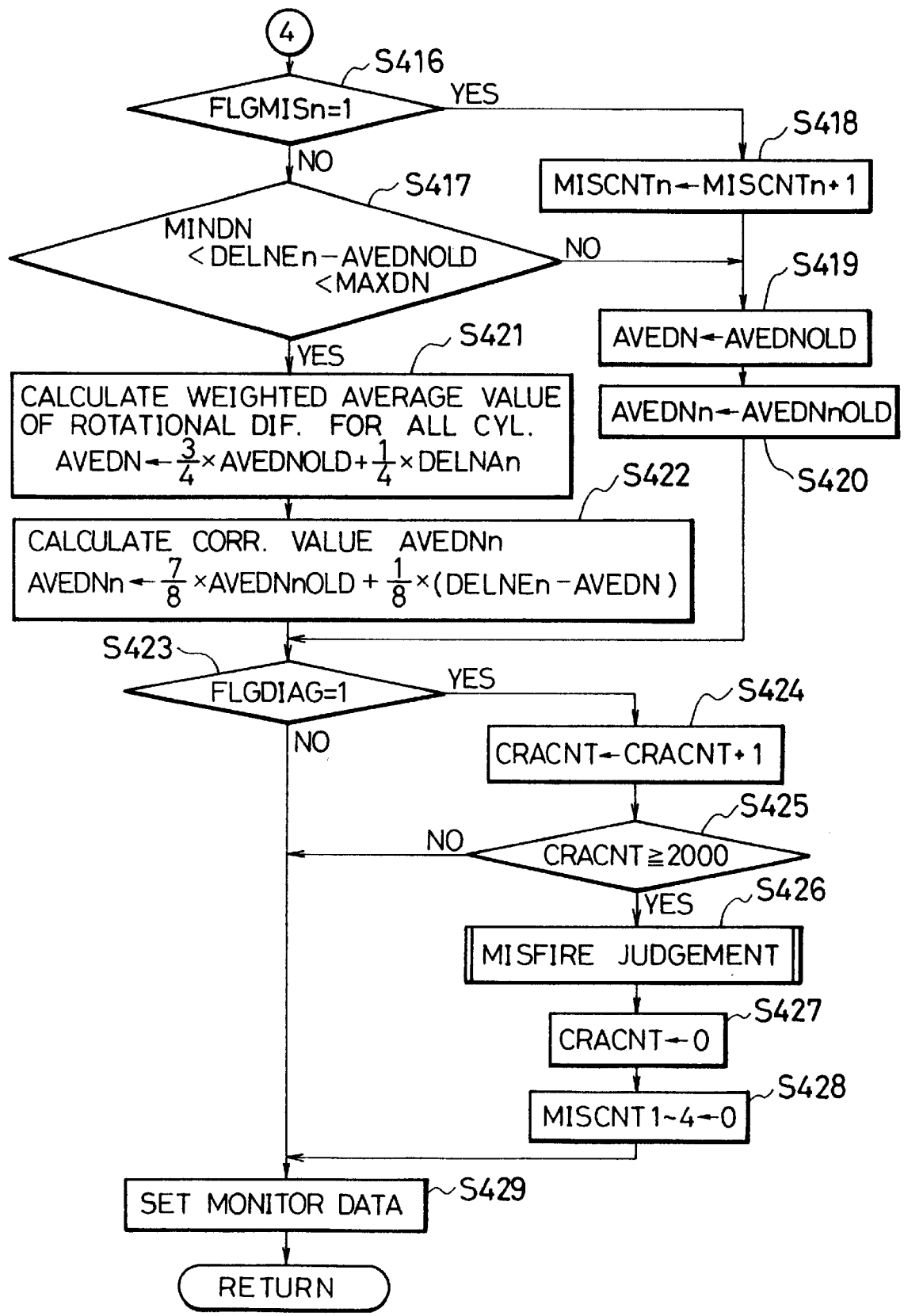

FIGS. 15 and 16 are flow charts showing a misfire detecting procedure to be executed by an ECU 41 of a misfire discriminating method for an engine according to the second embodiment of the present invention.

Here, steps having functions similar to those of the first embodiment are denoted by the corresponding symbols as in the first embodiment and shall be omitted from description.

In this embodiment, misfire detecting steps in the electronic control unit (ECU) 41 will be described in conjunction with the flow charts of FIGS. 15 to 16.

FIGS. 15 and 16 are flow charts showing a misfire diagnosis routine to be interrupted and executed in synchronization with a θ3 crank pulse from the crank angle sensor 32. At a step (hereinbelow, abbreviated to "S") 401, data obtained at the time of executing the previous routine are stored in a work area. At S402, an engine r.p.m. $MNX_n$ corresponding to cylinder #n (n=1, 3, 2, 4) is calculated from an input interval time between the θ2 and θ3 crank pulses and a holding angle (θ2–θ3) of the crank rotor 31 indicating the θ2 and the θ3 crank pulses, for example, in a range of 150 r.p.m. or more by considering a misfire in a low speed range of the engine.

Then, the control flow proceeds to S403, the engine speed $MNX_{n-1}$ corresponding to Xn-1 cylinder before one combustion stroke is subtracted from the engine speed $MNX_n$ corresponding to the cylinder No. #n calculated at the S402, and the rotational difference $DELNE_n$ is calculated ($DELNE_n$ from $MNx_n-MNX_{n-1}$)

Subsequently, at S404, the cylinder No. #n of the combustion stroke at this time is discriminated from n=1, 3, 2, 4 based on the crank pulse and the cam pulse output from the crank angle sensor 32 and the cam angle sensor 34, and at S405, the cylinder No. #n-1 before one combustion stroke is discriminated.

Figure 17:
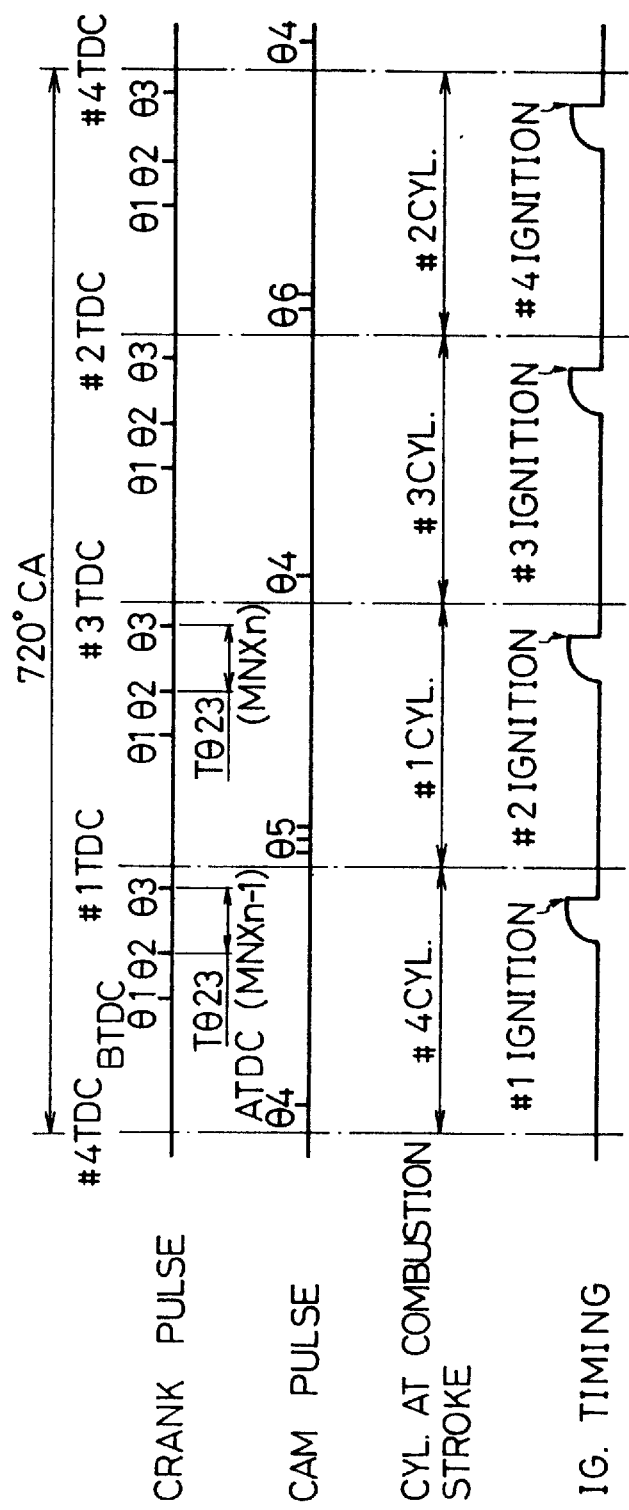

As shown, for example, in FIG. 17, in a case where the crank pulse is input from the crank angle sensor 32 after the θ5 cam pulse is input from the can angle sensor 34, the crank pulse is discriminated to be a signal indicating the crank angle of the cylinder No. #3. When the θ4 cam pulse is input after the θ5 cam pulse, the following crank pulse is discriminated to be a signal indicating the crank angle of the cylinder #2.

Similarly, the crank pulse after the θ6 cam pulse is input, indicates the crank angle of the cylinder No. #4. When the θ4 cam pulse is input after the θ6 cam pulse, the following crank pulse is discriminated to be a signal indicating the crank angle of the cylinder No. #1.

Further, the crank pulse to be input from the crank angle sensor 32 after the cam pulse is input from the cam angle sensor 34 is discriminated to indicate a reference crank angle (θ1) of the cylinder.

For example, in a case where a misfire diagnosis routine is now executed in synchronization with the θ3 crank pulse of the BTDC θ3 of the cylinder No. #3, the combustion stroke cylinder No. #n is the cylinder No. #1, and the cylinder No. #n-1 before one combustion stroke is the cylinder No. #4. In this case, the cylinder No. #1 as the cylinder No. #n at a combustion stroke is to be diagnosed for a misfire, and a misfire diagnosis of the corresponding cylinder (the cylinder No. #1 in this case) is executed by the next process by subtracting the speed MNX4 (=$MNX_{n-1}$) based on an input interval time between the θ2 and the θ3 crank pulses of the BTDC θ2, θ3 of the cylinder No. #1 calculated at the time of executing the previous routine, from the speed MNX1 (=$MNX_n$) calculated based on the input interval time Tθ23 between the θ2 and the θ3 crank pulses of the BTDC θ2, θ3 of the cylinder No. #3.

In this case, the detected position of the crank angle by the crank angle sensor 32 includes an allowable error in the manufacture of the positions and shape of the projections 31a, 31b and 31c of the crank rotor 31 and an allowable error in the mounting position of the crank angle sensor 32 on the engine 1 in each engine. Therefore, the rotational difference $DELNE_n$ calculated based on the crank pulse from the crank angle sensor 32 includes an irregularity due to the errors. Particularly, when the engine is rotated at a high speed, as shown in FIG. 18, a large variation in the engine speed apparently unitarily occurs.

Therefore, since an erroneous discrimination occurs in a case where the rotational difference $DELNE_n$ calculated in the S403 is used as it is to discriminate a misfire, at the S406,the rotational difference weighed average value $AVEDN_nOLD$ (calculated at the time of executing the previous routine) of the cylinder statistically processed from the rotational difference $DELNE_n$ is subtracted from the rotational difference $DELNE_n$, and calculated as a rotational difference $DELNA_n$ after correction ($DELNA_n$ from $DELNE_n - AVEDN_nOLD$).

Figure 18:
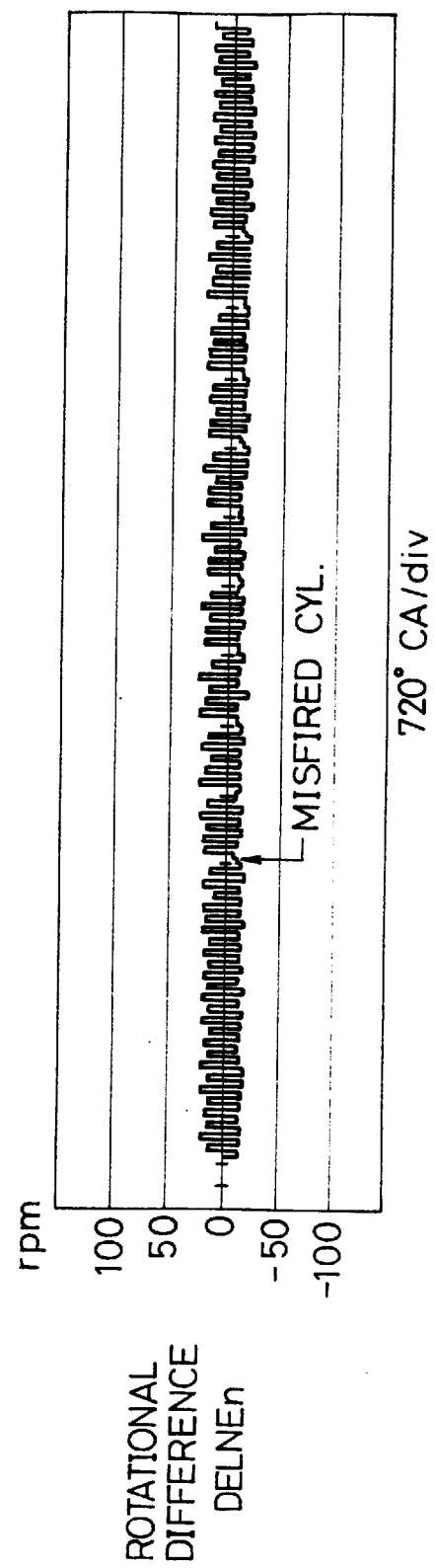
Figure 19:
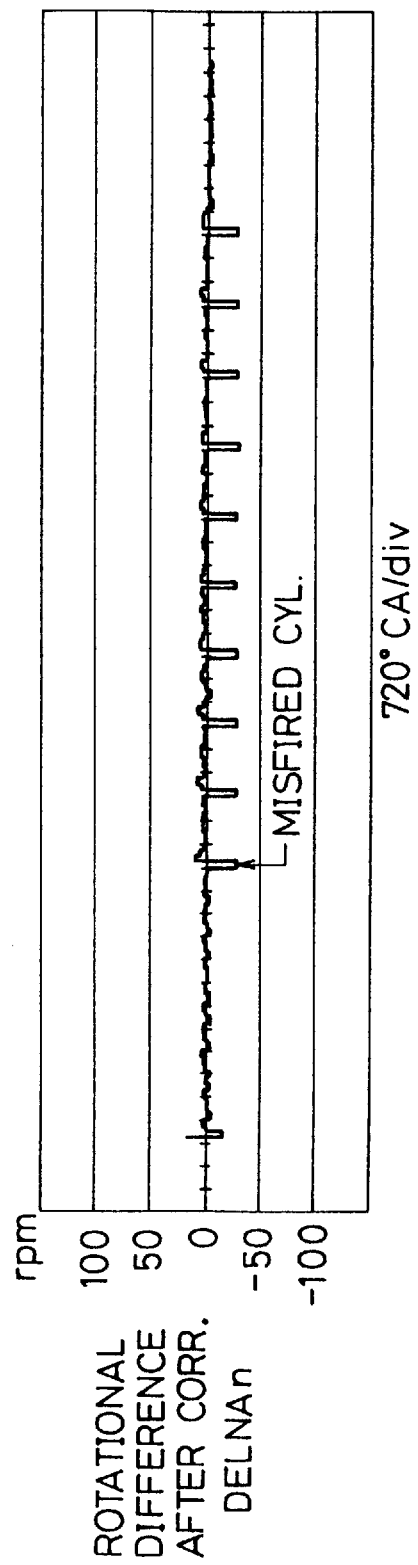

As a result, influence of allowable error in manufacture of the position and the shape of the projections 31a, 31b and 31c of the crank rotor 31 and allowable error of the mounting position of the crank angle sensor 32 on the engine 1, is eliminated from the rotational difference $DELNE_n$ before correction shown in FIG. 18, and as shown in FIG. 19, an accurate rotational difference between the engine speed corresponding to the cylinder No. #n and the engine speed corresponding to the cylinder No. #n−1 can be obtained.

Figure 20:
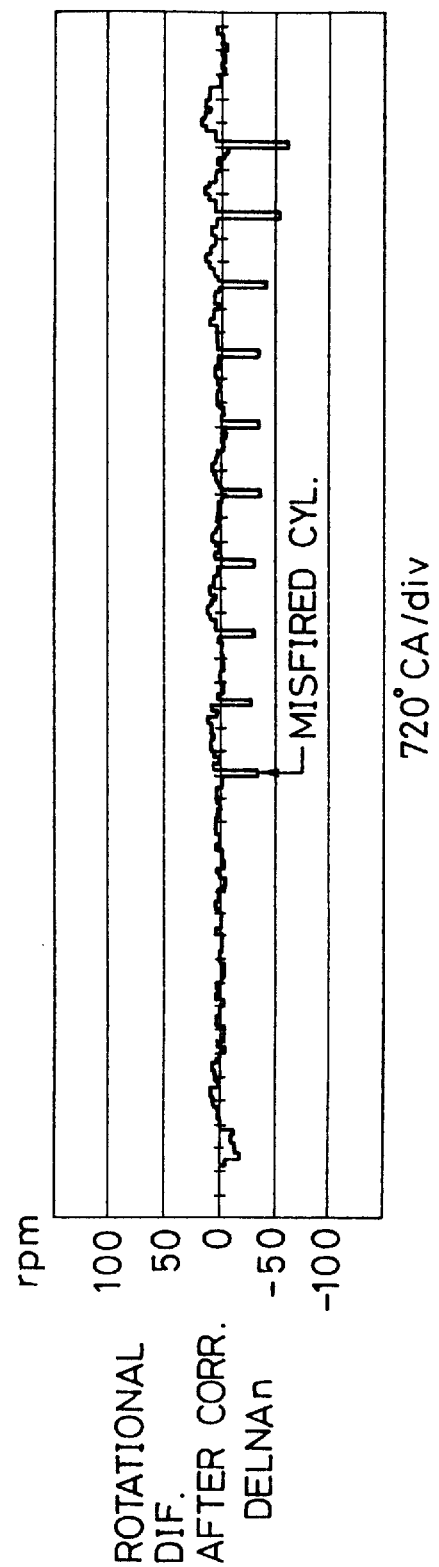

In FIGS. 18, 19 and 20 (to be described later), a rotational difference data calculated by the ECU 41 from 50 revolutions of one division of a vertical axis and 720° CA of one division (1 div) of a lateral axis, is indicated.

Subsequently, the S406 proceeds to S407, S408, and whether misfire diagnosis conditions are satisfied or not is discriminated in S407, and S408. That is, at the S407, whether fuel is cutting or not is checked, at the S408, whether basic fuel injection pulse width Tp is smaller than a set value TpLWER or not is checked. At the S409, whether the engine speed NE is more than a set speed NEUPER or not is checked.

When fuel is cut at the S407, when Tp<TpLWER at the S408 or NE≧NEUPER at the S409 is satisfied, the diagnosis conditions are not satisfied, and hence at the steps are branched to the S414. When a diagnosis allowance flag FLGDIAG is cleared (FLGDIAG to "0"), at the S415, a misfire flag $FLGMIS_n$ of the cylinder indicating occurrence of a misfire is cleared ($FLGMIS_n$ to "0"), and proceeds to the S416.

On the other hand, in a case where fuel is not cut and Tp≧TpLWER and NE<NEUPER are satisfied through the S407, S408, and S409, the diagnosis conditions are satisfied, and hence at S410, a diagnosis allowance flag FLGDIAG is set (FLGDIAG to "1"), and proceeds to the S411.

At the S411, with the engine speed NE and the basic fuel injection pulse width Tp as parameters a misfire discrimination level map is referred with an interpolation calculation. When a misfire discrimination level LVLMIS is set, the control flow proceeds to the S412, and whether a rotational difference $DELNA_n$ after correction calculated at the S406 is smaller than a negative misfire discrimination level (−LVLMIS) or not is discriminated.

The misfire judgement level LVLMIS is stored as a map in the ROM 43 as a value, as shown in FIG. 13, in which a slice level is raised as a load is increased when a basic fuel injection pulse width Tp is increased, and an engine low load range having a small basic fuel injection pulse width Tp is in a mistaken diagnosis area in which diagnosis is impossible.

At the S412, in a case where $DELNA_n \geq -LVLMIS$ is satisfied, no misfire is discriminated, the control flow branches to the S415, and in a case where $DELNA_n < -LVLMIS$ is satisfied, a misfire is discriminated, the control flow proceeds to the S413, a misfire flag $FLGMIS_n$ is set ($FLGMIS_n$ to "1"), and the control flow process to the S414.

At the S416, a value of the misfire flag $FLGMIS_n$ is referred, when $FLGMIS_n = 0$, i.e., when a misfire is not generated in the cylinder No. #n to be diagnosed for the misfire, at the S417, whether a difference $\Delta$ ($=DELNE_n - AVEDNOLD$) between the rotational difference $DELNE_n$ and the rotational difference weighed average value AVEDNOLD of all the cylinders falls within a predetermined set range between the upper and the lower set values MINDN and MAXDN (MINSN<MAXSN) or not is discriminated.

At the S417, when MINDN<Δ<MAXDN is satisfied and the difference falls within the set range, change of the rotational difference $DELNE_n$ is discriminated by an error of the crank rotor 31 or the crank angle sensor 32. At S421, S422, the rotational difference $DELNE_n$ is statistically processed, and proceeds to S423.

More specifically, at the S421, in order to correct the rotational difference change due to the error, new entire cylinder rotational difference weighed average value AVEDN is calculated from the rotational difference weighed average value AVEDNOLD of all the cylinders up to the previous time and the rotational difference $DELNA_n$ after correction of the cylinder No. #n−1(AVEDN from (¾)× AVEDNOLD+(¼)×$DELNA_n$). At the S422, new rotational difference correction value $AVEDN_n$ of the present cylinder No. #n is calculated from the difference between the new entire cylinder rotational difference weighed average value AVEDN and the rotational difference $DELNE_n$ of the cylinder No. #n and the rotational difference correction value $AVEDN_{OLD}$ of the cylinder NO. #n up to the previous time ($AVEDN_{n-1}$ from (⅞)×$AVEDN_{OLD}$+(⅛)×($DELNE_n$− AVEDN)).

On the other hand, at the S416, in a case where $FLGMIS_n = 1$, i.e., a misfire occurs in the cylinder No. #n, at the S418, the counted value $MISCNT_n$ of the number of misfires is counted up, and proceeds to the S419. In a case where, at the S417, Δ≦MINDN or Δ≧MAXDN is satisfied, it means the variation in the rotational difference $DELNE_n$ irrespective of the error of the crank rotor 31 or the crank angle sensor 32, a variation in the rotational difference $DELNE_n$ due to another cause such as a snatch, acceleration/deceleration or the like is discriminated, and proceeds to the S419.

At the S419, the entire cylinder rotational difference weighed average value AVEDNOLD up to the previous time is set to the entire cylinder rotational difference weighed average value AVEDN at this time (AVEDN←AVEDNOLD), at the S420, the rotational difference $AVEDNOLD_n$ of the cylinder No. #n up to the previous time is set to the new rotational difference correction value $AVEDN_n$ of the cylinder No. #n, ($AVEDN_n$←$AVEDN_{OLD}$) and proceeds to S423.

In a case where the S420 or S422 proceeds to the S423, the value of diagnosis allowance flag FLGDIAG is referred. When FLGDIAG=0, the control flow jumps to S429, and when FLGDIAG=1, at S424, a counted value CRACNT to be counted at each execution of a misfire diagnosis is counted up (CRACNT to CRACNT+1), and at step S425, whether the counted value CRACNT reaches 2000 or not is discriminated, i.e., since the misfire detection routine is executed at each ½ revolution of engine at each input of θ3 crank pulse, whether the counted value CRACNT becomes a value of 1000 revolutions of the engine or not is discriminated.

As described above, since the misfire detection routine is executed at each input of θ3 crank pulse, i.e., each ½ revolution of the engine, the counted value CRACNT=2000 indicates 1000 r.p.m. of the engine.

At the S425, in a case where CRACNT<2000 is satisfied, the control flow branches to S429. When CRACNT≧2000 is satisfied, at the S426, a misfire judging subroutine to be described later is executed. When at the S427, S428, the counted value CRACNT, the counted value MISCNT1~4 of the number of misfires for all the cylinders are cleared, CRACNT←"0", MISCNT1~4←"0") the control flow proceeds to the S429. At the S429, the data of the rotational difference DELNE$_n$ calculated this time, the rotational difference DELNA$_n$ after correction, the rotational entire cylinder rotational difference weighed average value AVEDN and the rotational difference correction value AVEDN$_n$ of the cylinder No. #n are set in the RAM 44 as data to be monitored, and the routine is completed.

As described above, according to the present invention, in a case where a misfire is detected based on the output from the rotation detecting means for detecting the rotation of the engine, the engine speed of the cylinder at the combustion stroke and the rotational difference of the engine speed of the cylinder before one combustion stroke are statistically processed, then the misfire is detected by comparing it with the discrimination level set based on the engine operating state, and hence influence of the error of the rotation detecting means can be eliminated, and the misfire of the cylinder can be accurately detected to obtain excellent effects.

Figure 21:
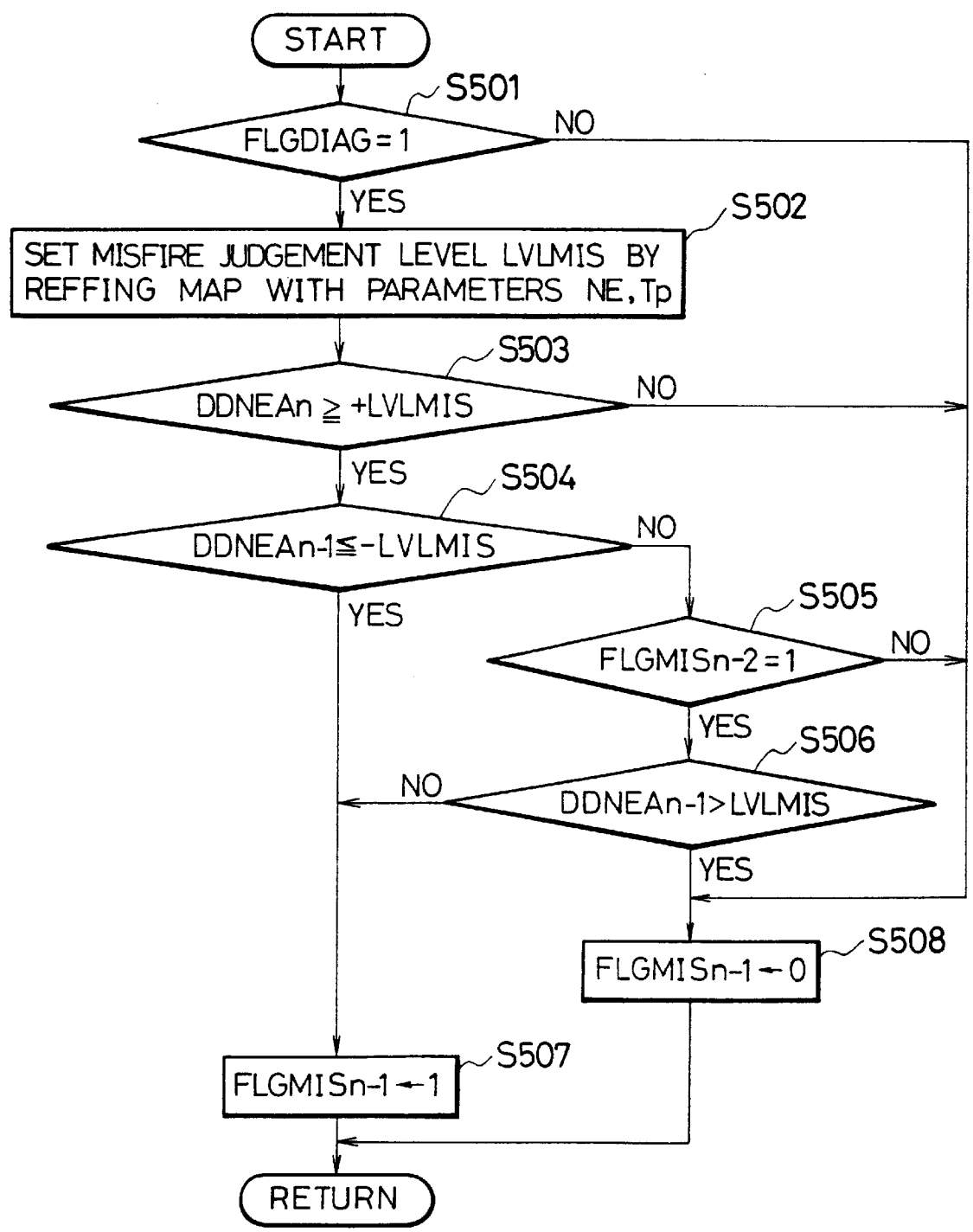
Figure 22:
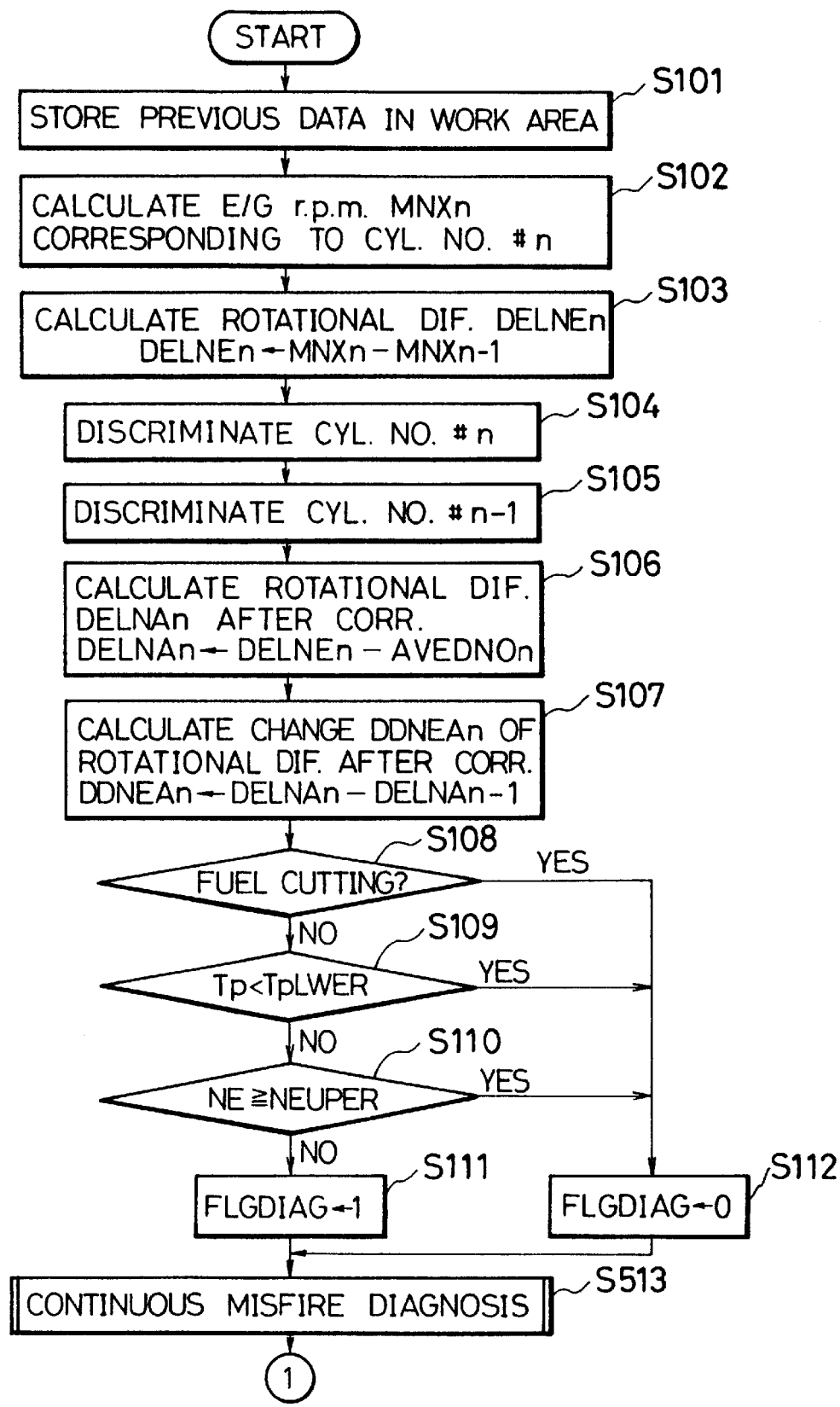

FIGS. 21 and 22 show flow charts showing a misfire discriminating procedure of a misfire discriminating method for an engine according to the third embodiment of the present invention.

Here, steps having functions similar to those of the first embodiment are denoted by the corresponding symbols as in the first embodiment and shall be omitted from description.

In this embodiment, misfire detecting steps in the electronic control unit (ECU) 41 will be described in conjunction with the flow charts of FIGS. 21 and 22.

FIGS. 21 and 22 are flow charts showing a misfire diagnosis routine to be interrupted and executed in synchronization with a θ3 crank pulse from the crank angle sensor 32. At a step (hereinbelow, abbreviated to "S") 101, data obtained at the time of executing the previous routine are stored in a work area. At S102, an engine r.p.m. MNX$_n$ corresponding to cylinder #n (n=1, 3, 2, 4) is calculated from an input interval time between the θ2 and θ3 crank pulses and a holding angle (θ2–θ3) of the crank rotor 31 indicating the θ2 and the θ3 crank pulses, for example, in a range of 150 r.p.m. or more by considering a misfire in a low speed range of the engine.

Then, the control flow proceeds to S103, the engine speed MNX$_{n-1}$ corresponding to Xn-1 cylinder before one combustion stroke is subtracted from the engine speed MNX$_n$ corresponding to the cylinder No. #n calculated at the S102, and a rotational difference DELNE$_n$ is calculated (DELNE$_n$ from MNX$_n$-MNX$_{n-1}$).

Subsequently, at S104, the cylinder No. #n of the combustion stroke at this time is discriminated from n=1, 3, 2, 4 based on the crank pulse and the cam pulse output from the crank angle sensor 32 and the cam angle sensor 34, and at S105, the cylinder No. #n-1 before one combustion stroke is discriminated.

Similarly, the crank pulse after the θ6 cam pulse is input, indicates the crank angle of the cylinder No. #4. When the θ4 cam pulse is input after the θ6 cam pulse, the following crank pulse is discriminated to be a signal indicating the crank angle of the cylinder No. #1.

Further, the crank pulse to be input from the crank angle sensor 32 after the cam pulse is input from the cam angle sensor 34 is discriminated to indicate a reference crank angle (θ1) of the cylinder.

In the embodiment, in a case where the ignition order is #1 to #3 to #2 to #4 and a misfire diagnosis routine is now executed in synchronization with the θ3 crank pulse of the BTDC θ3 of the cylinder No. #3, the combustion stroke cylinder No. #n is the cylinder No. #1, the cylinder No. #n-1 before one combustion stroke is the cylinder No. #4, and the cylinder #n-2 before two combustion strokes is the cylinder No. #2.

In this case, the detected position of the crank angle by the crank angle sensor 32 includes an allowable error in the manufacture of the positions and shape of the projections 31a, 31b and 31c of the crank rotor 31 and an allowable error in the mounting position of the crank angle sensor 32 on the engine 1 in each engine.

Therefore, the rotational difference DELNE$_n$ calculated based on the crank pulse from the crank angle sensor 32 includes an irregularity due to the errors. Particularly, when the engine is rotated at a high speed, as shown in FIG. 23, a large variation in the engine speed apparently unitarily occurs.

As a result, the S105 proceeds to S106, the rotational difference correction value AVEDNO$_n$ of the cylinder No. #n up to the previous time calculated by statistically processing the rotational difference DELNE$_n$ is subtracted from the rotational difference DELNE$_n$ calculated at the S103, calculated as a rotational difference DELNA$_n$ after correction (DELNA$_n$ from DELNA$_n$-AVEDNO$_n$). Thus, influence of the allowable error in manufacture of the position and the shape of the projections 31a, 31b and 31c of the crank rotor 31, and the allowable error in mounting position of the crank angle sensor 32 on the engine 1 is eliminated from the rotational difference DELNE$_n$ before the correction shown in FIG. 23, and, as shown in FIG. 24, an accurate rotational difference between the engine speed corresponding to the cylinder No. #n and the engine speed corresponding to the cylinder No. #n-1 before one combustion stroke is obtained.

Figure 23:
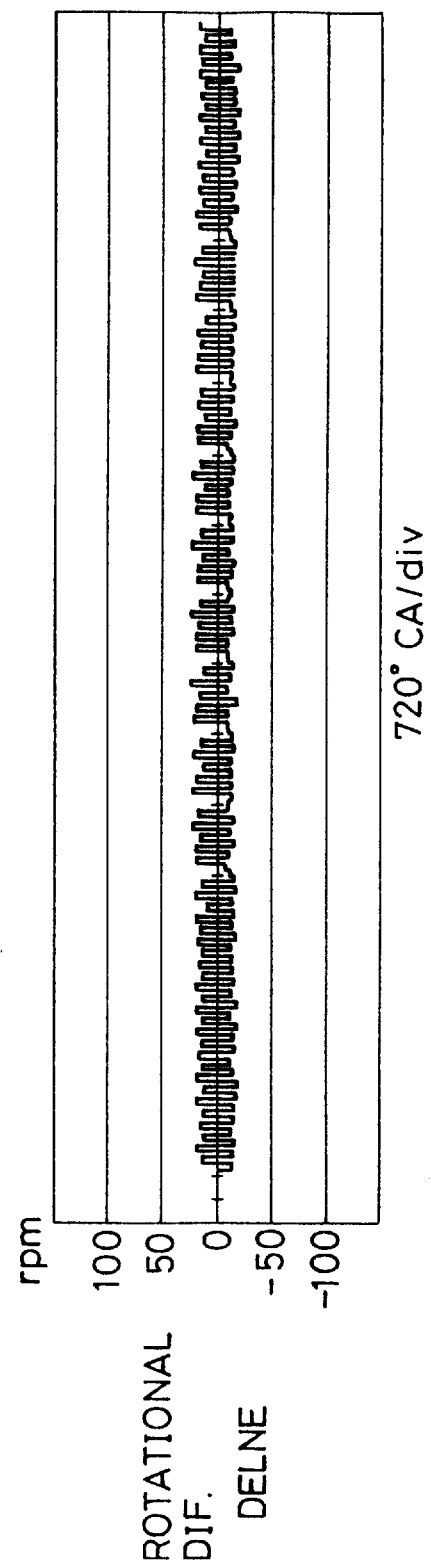
Figure 24:
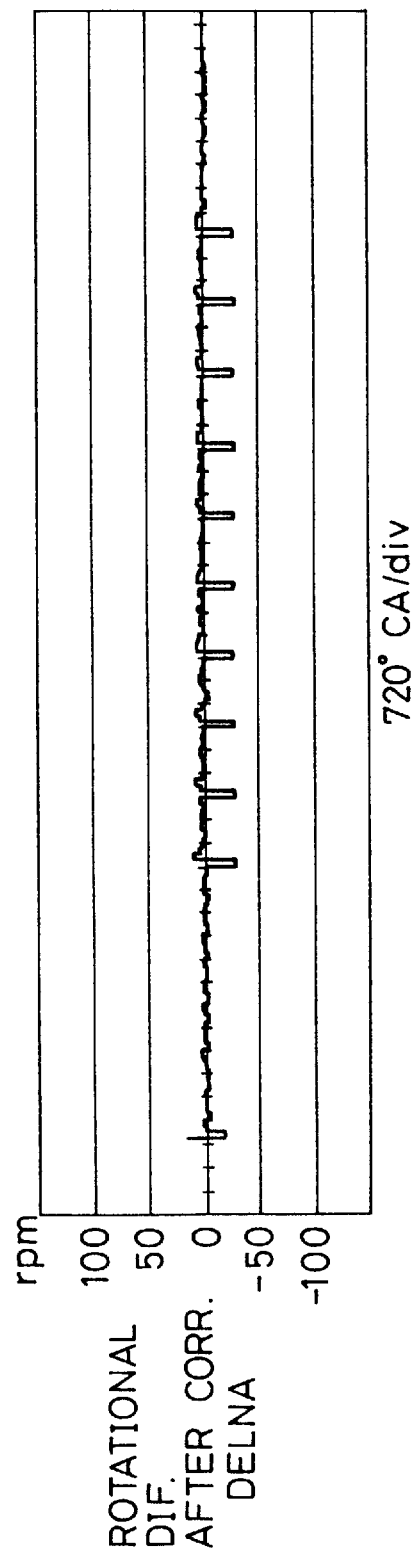

In FIGS. 23 and 24, a rotational difference data calculated by the ECU 41 from 50 revolutions of one division of a vertical axis and 720° CA of one division (1 div) of a lateral axis, is indicated.

As described above, in a case where the misfire diagnosis routine is, for example, executed in synchronization with the BTDC θ3 crank pulse of the cylinder No. #3, the cylinder No. #4 as the cylinder No. #n-1 before one combustion stroke is to be diagnosed for a misfire, and the misfire diagnosis of the cylinder No. #4 (the cylinder No. #n-1) is executed by the following process from the change state of a rotational difference DELNA4 after correction (=DELNA$_{n-1}$) of the cylinder No. #4 (the cylinder No. #n-1) obtained at the time of executing the previous routine by subtracting the speed MNX2 (=MNX$_{n-2}$) of the cylinder No. #2 (the cylinder No. #n-2) before two combustion strokes based on an input interval time between the BTDC θ2 and θ3 crank pulses of the cylinder No. #1 from the speed MNX4 (=MNX$_{n-1}$) of the cylinder No. #4 (cylinder No. #n-1) before one combustion stroke calculated based on an input interval time between the BTDC θ2 and θ3 crank pulses of the cylinder No. #1, and statistically processing it, from a rotational difference DELNA1 (=DELNE$_n$) after correction of the cylinder No. #1 (the cylinder No. #n) obtained by the routine this time by subtracting the speed MNX4 (=MNX$_{n-1}$) based on an input interval time between the BTDC θ2 and θ3 crank pulses of the cylinder No. #1 from the speed MNX1 (=MNX$_n$) based on an input interval time between the BTDC θ2 and θ3 crank pulses of the cylinder No. #3 and statistically processing it.

Then, the S106 proceeds to S107, and a difference between the rotational difference DELNA$_n$ after correction of the cylinder No. #n and the rotational difference DELNA$_{n-1}$ after correction of the cylinder No. #n−1 calculated at the time of executing the previous routine is calculated as a rotational difference change DDNEA$_n$ after correction (DDNEA$_n$ from DELNA$_n$−DELNA$_{n-1}$).

More specifically, when an intermittent rotation change such as a snatch occurs in the engine, it is difficult to discriminate an accurate misfire merely by comparing the rotational difference DELNA$_n$ after correction with a predetermined misfire judgement level. Therefore, an accurate misfire can be detected by eliminating influence of engine speed change due to a snatch and the like for the rotational difference (rotational difference after correction) changing at a level in response to the engine operating state at the time of a misfire by collecting the rotational difference change after correction of the cylinder before and after the variation.

Subsequently, the S107 proceeds to S108 and following steps, and whether misfire diagnosis conditions are satisfied or not is discriminated in S108, S109 and S110. That is, at the S108, whether fuel is cutting or not is checked, at the S109, whether basic fuel injection pulse width Tp is smaller than a set value TpLWER or not is checked. At the S110, whether the engine speed NE is a set speed NEUPER or more or not is checked.

In a case where fuel is not cut and Tp≧TpLWER and NE<NEUPER are satisfied through the S108, S109 and S110, the diagnosis conditions are satisfied, and hence at S111, a diagnosis allowance flag FLGDIAG is set (FLGDIAG to "1"). On the other hand, when fuel is cutting at the S108, Tp<TpLWER is satisfied at the S109 or NE≧NEUPER is satisfied at the S110, the diagnosis conditions are not satisfied, and hence the respective steps branch to S112, and the diagnosis allowance flag FLGDIAG is cleared (FLGDIAG to "0").

In a case where the S111 or S112 proceeds to S513, a single misfire diagnosis subroutine to be described later is executed, and the next step, a value of misfire flag FLGMIS$_{n-1}$ of the cylinder No. #n−1 before one combustion stroke is referred, similarly to S114 in FIG. 3 of the first embodiment.

When a misfire is discriminated in the single misfire diagnosis at the S513, FLGMIS$_{n-1}$=1 is set. On the other hand, when FLGMIS$_{n-1}$=0, that is, a misfire does not occur in the cylinder No. #n−1 to be diagnosed for a misfire. And, the step is advanced to the next step, similarly from S114 to S115 of FIG. 3 of the first embodiment, and whether a difference Δ (=DELNE$_{n-1}$−AVEDNO) between the rotational difference DELNE$_{n-1}$ of the cylinder No. #n−1 and the rotational difference weighed average value AVEDNO of all the cylinders up to the previous time (=DELNE$_{n-1}$−AVEDNO) falls within a predetermined set range between upper and lower set values MINDN and MAXDN (MINDN<MAXDN) or not is discriminated.

At the next step, similarly to S115 of FIG. 3 of the first embodiment, when MINDN<Δ<MAXDN is satisfied and the difference falls within the set range, change of the rotational difference DELNE$_n$ is discriminated by an error of the crank rotor 31 or the crank angle sensor 32. Similarly to S119, S120 of FIG. 3 of the first embodiment, the rotational difference DELNE$_{n-1}$ is statistically processed, and proceeds to next step, similarly to S121 of FIG. 3 of the first embodiment.

More specifically, similarly to the S119 of FIG. 3 of the first embodiment, in order to correct the rotational difference change due to the error, new entire cylinder rotational difference weighed average value AVEDN is calculated from the rotational difference weighed average value AVEDNO of all the cylinders up to the previous time and the rotational difference DELNA$_{n-1}$ after correction of the cylinder No. #n−1 (AVEDN from (¾)×AVEDNOLD+(¼)× DELNA$_{n-1}$). Similarly to the S120 of FIG. 3 of the first embodiment, new rotational difference correction value AVEDN$_{n-1}$ of the cylinder No. #n−1 is calculated from the difference between the new entire cylinder rotational difference weighed average value AVEDN and the rotational difference DELNE$_{n-1}$ of the cylinder No. #n−1 and the rotational difference correction value AVEDNO$_{n-1}$ of the cylinder NO. #n−1 up to the previous time (AVEDN$_{n-1}$ from (⅞)×AVEDNO$_{n-1}$+(⅛)×(DELNE$_{n-1}$AVEDN)).

On the other hand, similarly to the S114 of FIG. 3, in a case where FLGMIS$_{n-1}$=1, i.e., a misfire occurs in the cylinder No. #n−1, similarly to the S116 of FIG. 3, the counted value MISCNT$_{n-1}$ of the number of misfires is counted up, and proceeds similarly to the S117 of FIG. 3.

In a case where, similarly to the S115 of FIG. 3, Δ≦MINDN or Δ≧MAXDN is satisfied, it means the variation in the rotational difference DELNE$_{n-1}$ irrespective of the error of the crank rotor 31 or the crank angle sensor 32, a variation in the rotational difference DELNE$_{n-1}$ due to another cause such as a snatch, acceleration/deceleration or the like is discriminated, and proceeds similarly to the S117 of FIG. 3.

Similarly to the S117 of FIG. 3 of the first embodiment, the entire cylinder rotational difference weighed average value AVEDNO up to the previous time is set to the entire cylinder rotational difference weighed average value AVEDN at this time (AVEDN to AVEDNO), similarly to the S118 of FIG. 3, the rotational difference AVEDNO$_{n-1}$ of the cylinder No. #n−1 up to the previous time is set to the new rotational difference correction value AVEDN$_{n-1}$ of the cylinder No. #n−1, (AVEDN$_{n-1}$ to AVEDNO$_{n-1}$) and proceeds similarly to S121 of FIG. 3.

In a case where the step similarly to S118 or S120 of FIG. 3 proceeds to the S121, the value of diagnosis allowance flag FLGDIAG is referred. When FLGDIAG=0, the control flow jumps to the step similarly to S127 of FIG. 3, and when FLGDIAG=1, at the step similarly S122 of FIG. 3, a counted value CRACNT to be counted at each execution of a misfire diagnosis is counted up (CRACNT to CRACNT+1), and at the step similarly to step S123 of FIG. 3, whether the counted value CRACNT reaches 2000 or not is discriminated.

As described above, since the misfire detection routine is executed at each input of θ3 crank pulse, i.e., each ½ revolution of the engine, the counted value CRACNT=2000 indicates 1000 r.p.m. of the engine.

At the step similarly to S123 of FIG. 3, in a case where CRACNT<2000 is satisfied, the control flow branches to the step similarly to S127 of FIG. 3. When CRACNT≧2000 is satisfied, at the step similarly to S124 of FIG. 3, a misfire judging subroutine to be described later is executed. When at the steps similarly to S125, S126 of FIG. 3, the counted value CRACNT, the counted value MISCNT1−4 of the number of misfires for all the cylinders are cleared (CRACNT to "0", MISCNT1–4 to "0"), the control flow proceeds to the step similarly to S127 of FIG. 3. At the step similarly to S127 of FIG. 3, the data of the rotational difference DELNE$_n$ calculated this time, the rotational difference DELNA$_n$ after correction, the rotational difference change DDNEA$_n$ after correction, the entire cylinder rotational difference weighed average value AVEDN and the rotational difference correction value AVEDN$_{n-1}$ of the cylinder No. #n−1 are set in the RAM 44 as data to be monitored, and the routine is completed.

Then, subroutines of a single misfire diagnosis of the S513 and misfire judgement of the step similarly to S124 of FIG. 3 in the above-described misfire diagnosis routine will be described.

First, in the subroutine of the single misfire diagnosis shown in FIG. 21, in case where the value of a diagnosis allowance flag FLGDIAG is referred at S501 and FLGDIAG=0 is satisfied, at S508, a misfire flag FLGMIS$_{n-1}$ of the cylinder No. #n−1 before one combustion stroke is cleared (FLGMIS$_{n-1}$ to "0"), the routine is completed, and when FLGDIAG=1, the control flow proceeds to S502.

At the S502, with the engine speed NE and the basic fuel injection pulse width Tp as parameters, a misfire discrimination map is referred with an interpolation calculation, a misfire judgement level LVLMIS is set, and the control flow proceeds to S503 and following steps.

Figure 25:
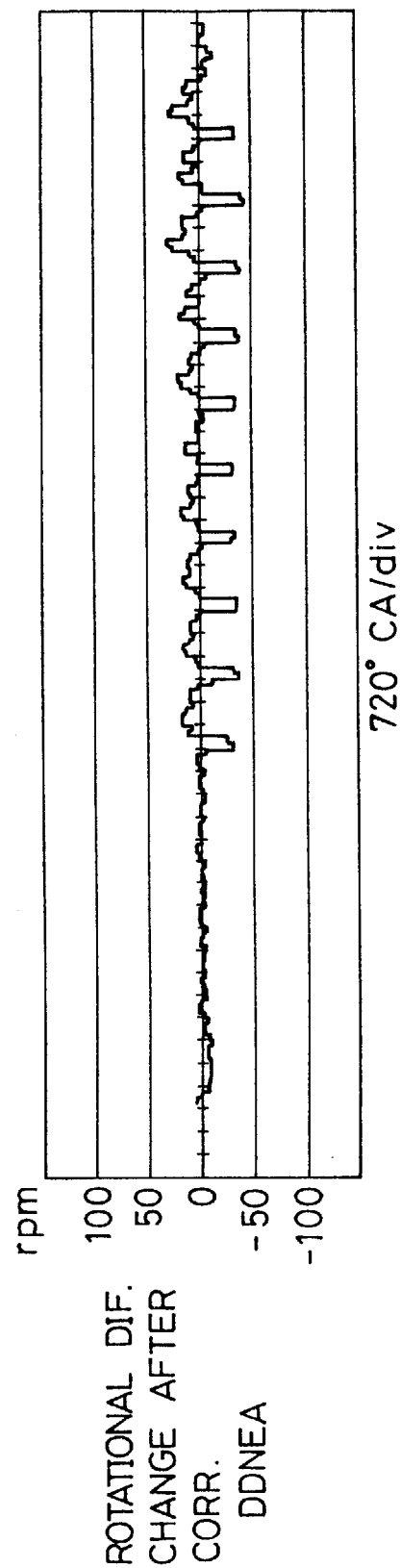

The misfire judgement level LVLMIS is stored as a map in the ROM 43 as a value, as shown in FIG. 25, in which a slice level is raised as a load is increased when a basic fuel injection pulse width Tp is increased with an engine low load range having a small basic fuel injection pulse width Tp is in a mistaken diagnosis area in which diagnosis is impossible.

Then, when the S502 proceeds to the S503, the rotational difference change DDNEA$_n$ after correction of the cylinder No. #n and the rotational difference change DDNEA$_{n-1}$ after correction of the cylinder No. #n read out from the RAM 44 are compared with the misfire judgement level LVLMIS set at the S502, at the S503, S504, and the misfire is judged.

First, at the S503, the misfire judgement level LVLMIS is compared with the rotational difference change DDNEA$_n$ after correction of the cylinder No. #n is compared with the misfire judgement level LVLMIS, and when DDNEA$_n$<LVLMIS is satisfied, the routine is completed through the above-described S508. When DDNEA$_n$≧LVLMIS is satisfied, at the S504, negative misfire judgement level (−LVLMIS) is compared with the rotational difference change DDNEA$_{n-1}$ after correction of the cylinder No. #n−1.

At the S504, when DDNEA$_{n-1}$>−LVLMIS is satisfied, no misfire is judged, the control flow branches to the S505. When DDNEA$_{n-1}$≦−LVLMIS is satisfied, misfire of the cylinder No. #n−1 is judged, the control flow proceeds to the S507, the misfire flag is set (FLGMIS$_{n-1}$ to "1"), and the routine is completed.

On the other hand, at the S504, when DDNEA$_{n-1}$>−LVLMIS and the rotational difference DELNA after correction is not dropped to the misfire discrimination level LVLMIS or less from the cylinder No. #n−2 to the cylinder No. #n−1, the S504 proceeds to the S505, and whether the misfire flag FLGMIS$_{n-2}$ of the cylinder No. #n−2 is set or not is discriminated, i.e., whether the cylinder No. #n−2 is misfired or not is discriminated.

At the S505, when FLGMIS$_{n-2}$=0 and the cylinder No. #n−2 is not misfired, the routine is completed through the S208. When the FLGMIS$_{n-2}$=1 and the cylinder No. #n−2 is misfired, the S505 proceeds to the S506, the rotational difference DDNEA$_{n-1}$ after correction of the cylinder No. #n−1 is compared with the misfire discrimination level LVLMIS, and whether the misfire of the cylinder No. #n−2 is also continued in the cylinder No. #n−2 or not is discriminated.

As a result, at the S506, when DDNEA$_{n-1}$≦LVLMIS and the drop of the rotational difference DELNA after correction due to the misfire is not recovered, the misfire of the cylinder No. #n−1 is also discriminated, the S506 branches to the S507, the misfire flag FLGMIS$_{n-1}$ of the cylinder No. #n−1 is set (FLGMIS$_{n-1}$ to "1"). When DDNEA$_{n-1}$>LVLMIS and the drop of the rotational difference DELNA after correction is recovered from the cylinder No. #n−2 to the cylinder No. #n−1, the end of the misfire is discriminated, and the routine is completed through the S508.

More specifically, only when the rotational difference after correction is increased toward forward of the misfire judgement level LVLMIS or more from the cylinder No. #n−1 to the cylinder No. #n after the rotational difference after correction is reduced toward afterward of the misfire judgement level LVLMIS or less from the cylinder No. #n−2 to the cylinder No. #n−1, the misfire of the cylinder No. #n−1 is judged, and hence as shown in FIG. 25, it is distinguished from engine rotation change such as a snatch varying continuously at the rotational difference for a predetermined period, and hence the misfire can be accurately detected.

Further, in the subroutine of the misfire judgement similarly to FIG. 4 of the first embodiment, at S301, total misfire count ΣMISCNT$_n$ (n=1 to 4) of four cylinders is divided by the counted value CRACNT (=2000) at the previous S122, and a misfire rate MISCNT (%) per 1000 revolutions of the engine is calculated (MISCNT to ΣMISCNT$_n$/CRACNT× 100).

Subsequently, the control flow proceeds to the step similarly S302 of FIG. 4 of the first embodiment, and whether the misfire rate MISCNT calculated at the S301 is smaller than a set value LMSCNT or not is judged. The set value LMSCNT is a constant previously stored in ROM 43 with the engine speed NE and the basic fuel injection pulse width Tp as parameters.

As a result of the judgement at the step similarly to S302 of FIG. 4 of the first embodiment, when MISCNT≧LMSCNT is satisfied, at the step similarly to the S303 of FIG. 4, the misfire rate MISCNT is stored in a predetermined address of the back-up RAM 44a, and at the step similarly to S304 of FIG. 4, whether first misfire judgement NG flag FLGNG1 stored in a predetermined address of the back-up RAM 44a is set or not is checked.

At the step similarly to S304 of FIG. 4, in a case where the first misfire judgement NG flag FLGNG1 is not yet set and FLGNG1="0", the S304 is jumped to S306. When the first misfire judgement NG flag FLGNG1 is set and FLGNG1="1", the S304 proceeds to S305, second misfire judgement NG flag FLGNG2 stored in a predetermined address of the back-up RAM 44a is set (FLGNG2 to "1"), the ECS lamp 53 is lit or flashed to generate an alarm to a user, and the control flow proceeds to S306.

At the step similarly to S306 of FIG. 4, the first misfire judgement NG flag FLGNG1 is set (FLGNG1 to "1"), at S312, a misfire OK counter for counting judgements of no abnormality is cleared, (CNTOK to "0") and the routine is completed.

More specifically, in order to avoid an erroneous diagnosis due to noise or the like, even if the misfire rate MISCNT becomes the set value LMSCNT or more at the first judgement, an alarm is not immediately generated, but in a case where the misfire rate MISCNT continuously becomes the set value LMSCNT or more at the second judgement, the cylinder is judged to be abnormal, and an alarm is generated.

Incidentally, at this time, trouble data of the misfire cylinder are stored in the back-up RAM 44a, and when a trouble shooting is executed by a dealer, the trouble data stored in the back-up RAM 44a is read out by a flashing code of the monitoring lamp of the ECU 41 or the serial monitor 54. After the misfire cylinder is judged and repaired, the trouble data in the back-up RAM 44a is cleared through the serial monitor 54.

On the other hand, in a case where MISCNT<LMSCNT is satisfied at the S302, no abnormality is judged. At S307, when a misfire OK counter CNTOK is incremented (CNTOK to CNTOK+1), at S308, whether the value of the misfire OK counter CNTOK exceeds 80 times or not is judged. When CNTOK<80, the routine is completed as it is. When CNTOK≧80, at S309, S130, S311, first misfire judgement NG flag FLGNG1, second misfire judgement NG flag FLGNG2 and the misfire rate MISCNT are cleared (FLGNG1 to "0", FLGNG2 to "0", MISCNT to "0"), at the S312, the misfire OK counter CNTOK is cleared (CNTOK to "0"), and the routine is completed.

As described above, according to the present invention, a first engine r.p.m. (MNXn) of a first cylinder number (#n) at a present combustion stroke, (S102) is sensed, a second engine r.p.m. (MNXn−1) of a second cylinder number (#n−1) at a previous combustion stroke is detected, (S102), a rotational difference (DELNEn) is calculated by subtracting said second engine r.p.m. (MNXn−1) from said first engine r.p.m. (MNXn); (S103), a rotational difference ((DELNAn) after correction is computed by comparing said rotational difference (DELNEn) with a reference value (AVEDNOn) corresponding to an engine operating condition; (S406), a difference change (DDNEAn) is derived by subtracting a previous rotational difference (DELNAn−1) from said rotational difference (DELNAn); (S107) and a misfire condition for said previous cylinder (#n−1) is judged when said difference change (DDNEAn) is larger than a predetermined misfire level (LVLMIS) and also when a previous difference change (DENEAn−1) is smaller than a minus value of said predetermined misfire level (−LVLMIS). (S503,S504). Therefore, the invention achieves excellent effects that the misfire of the cylinder can be always accurately detected without influence of the variation in the rotation of the engine due to a cause except the misfire.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. Misfire discriminating method for an engine, comprising:
    detecting a first engine speed during a combustion stroke of a first cylinder;
    detecting a second engine speed during a combustion stroke of a second cylinder previous to the combustion stroke of the first cylinder;
    calculating a rotational difference corresponding to the first cylinder by subtracting the second engine speed from the first engine speed;
    computing a corrected rotational difference corresponding to the first cylinder by subtracting a present rotational difference correction value corresponding to the first cylinder from the rotational difference corresponding to the first cylinder;
    determining a rotational difference change corresponding to the first cylinder by subtracting a corrected rotational difference corresponding to the second cylinder from the corrected rotational difference corresponding to the first cylinder; and
    judging a misfire condition for the combustion stroke of the second cylinder when
        the rotational difference change corresponding to the first cylinder is equal to or larger than a first predetermined misfire level and
        a rotational difference change corresponding to the second cylinder is equal to or smaller than a second predetermined misfire level.

2. A misfire discriminating method in accordance with claim 1, wherein the second predetermined misfire level is a negative value of the first predetermined misfire level.

3. A misfire discriminating method in accordance with claim 1, further including, when a misfire condition for the second combustion stroke is discriminated:
    obtaining a difference between a present general rotational difference weighed average and a rotational difference corresponding to the second cylinder by subtracting the present general rotational difference weighed average from the rotational difference corresponding to the second cylinder;
    determining whether the difference between the present general rotational difference weighed average and the rotational difference corresponding to the second cylinder falls within a predetermined range; and
    when the difference between the present general rotational difference weighed average and the rotational difference corresponding to the second cylinder falls within the predetermined range
        obtaining a new general rotational difference weighed average by weight averaging the present general rotational difference weighed average with the corrected rotational difference corresponding to the second cylinder,
        obtaining a difference between the new general rotational difference weighed average and the rotational difference corresponding to the second cylinder by subtracting the new general rotational difference weighed average from the rotational difference corresponding to the second cylinder, and
        obtaining a new rotational difference correction value corresponding to the second cylinder by weight averaging the present rotational difference correction value corresponding to the second cylinder with the difference between the new general rotational difference weighed average and the rotational difference corresponding to the second cylinder.

4. A misfire discriminating method in accordance with claim 1, further including determining whether present engine operating conditions satisfy predetermined misfire diagnosis conditions.

5. A misfire discriminating method in accordance with claim 4, further including:
    when a misfire condition for the combustion stroke of the second cylinder is discriminated, incrementing a value of a first counter; and
    when the predetermined misfire diagnosis conditions are satisfied by present engine operating conditions, incrementing a value of a second counter, determining if the value of the second counter exceeds a predetermined limit;
if the value of the second counter exceeds the predetermined limit,
1) obtaining a misfire rate by dividing the value of the first counter by the value of the second counter, comparing the misfire rate with a predetermined set value and
a) if the misfire rate exceeds the predetermined set value, determining whether a first misfire flag is set, and if the first misfire flag is set, setting a second misfire flag, and if the first misfire flag is not set, setting the first misfire flag and resetting a value of a non-abnormality counter, and
b) if the misfire rate does not exceed the predetermined set value, incrementing the value of the non-abnormality counter, and if the value of the non-abnormality counter is greater than or equal to a predetermined non-abnormality value, resetting the value of the first misfire flag and the value of the second misfire flag, and
2) resetting the value of the first counter and the value of the second counter.

6. Misfire discriminating method for an engine, comprising:
detecting a first engine speed during a combustion stroke of a first cylinder;
detecting a second engine speed during a combustion stroke of a second cylinder previous to the combustion stroke of the first cylinder;
calculating a rotational difference corresponding to the first cylinder by subtracting the second engine speed from the first engine speed;
computing a corrected rotational difference corresponding to the first cylinder by subtracting a present rotational difference weighed average value corresponding to the first cylinder from the rotational difference corresponding to the first cylinder; and
judging a misfire condition for the combustion stroke of the first cylinder when the corrected rotational difference is smaller than a negative value of a predetermined misfire level.

7. A misfire discriminating method in accordance with claim 6, further including, when a misfire condition for the combustion stroke of the first cylinder is discriminated:
obtaining a difference between a present general rotational difference weighed average and the rotational difference corresponding to the first cylinder by subtracting a present general rotational difference weighed average from the rotational difference corresponding to the first cylinder;
determining whether the difference between the present general rotational difference weighed average and the rotational difference corresponding to the first cylinder falls within a predetermined range; and
if the difference between the present general rotational difference weighed average and the rotational difference corresponding to the first cylinder falls within the predetermined range
obtaining a new general rotational difference weighed average by weight averaging the present general rotational difference weighed average with the corrected rotational difference corresponding to the first cylinder, obtaining a difference between the new general rotational difference weighed average and the rotational difference corresponding to the first cylinder by subtracting the new general rotational difference weighed average from the rotational difference corresponding to the first cylinder, and
obtaining a new rotational difference weighed average value corresponding to the first cylinder by weight averaging the rotational difference weighed average value corresponding to the first cylinder with a difference between the new general rotational difference weighed average and the rotational difference corresponding to the first cylinder.

8. A misfire discriminating method in accordance with claim 6, further including determining whether predetermined misfire diagnosis conditions are satisfied by present engine operating conditions.

9. A misfire discriminating method in accordance with claim 8, further including:
when a misfire condition for the combustion stroke of the first cylinder is discriminated, incrementing a value of a first counter; and
when the predetermined misfire diagnosis conditions are satisfied by present engine operating conditions,
incrementing a value of a second counter,
determining if the value of the second counter exceeds a predetermined limit;
if the value of the second counter exceeds the predetermined limit,
1) obtaining a misfire rate by dividing the value of the first counter by the value of the second counter, comparing the misfire rate with a predetermined set value and
a) if the misfire rate exceeds the predetermined set value determining whether a first misfire flag is set, and if the first misfire flag is set, setting a second misfire flag, and if the first misfire flag is not set, setting the first misfire flag and resetting a value of a non-abnormality counter, and
b) if the misfire rate does not exceed the predetermined set value, incrementing the value of the non-abnormality counter, and if the value of the non-abnormality counter is great than or equal to a predetermined non-abnormality value, resetting the value of the first misfire flag and the value of the second misfire flag, and
2) resetting the value of the first counter and the value of the second counter.

10. Misfire discriminating method for an engine, comprising:
detecting a first engine speed during a combustion stroke of a first cylinder;
detecting a second engine speed during a combustion stroke of a second cylinder previous to the combustion stroke of the first cylinder;
calculating a rotational difference corresponding to the first cylinder by subtracting the second engine speed from the first engine speed;
computing a corrected rotational difference corresponding to the first cylinder by subtracting a present rotational difference correction value corresponding to the first cylinder from the rotational difference corresponding to the first cylinder;
determining a rotational difference change corresponding to the first cylinder by subtracting a corrected rotational difference corresponding to the second cylinder from the corrected rotational difference corresponding to the first cylinder;

deciding a continuation of a misfire condition when the rotational difference change corresponding to the first cylinder is larger than a first predetermined misfire level and a rotational difference change corresponding to the second cylinder is equal to or smaller than a second predetermined misfire level; and deciding a finish of said misfire condition when the rotational difference change corresponding to the second cylinder is larger than the first predetermined misfire level.

11. A misfire discriminating method in accordance with claim 10, wherein the first predetermined misfire level is a negative value of the second predetermined misfire level.

12. A misfire discriminating method in accordance with claim 10, further including, when a misfire condition for the second combustion stroke is discriminated:

obtaining a difference between a present general rotational difference weighed average and a rotational difference corresponding to the second cylinder by subtracting the present general rotational difference weighed average from the rotational difference corresponding to the second cylinder;

determining whether the difference between the present general rotational difference weighed average and the rotational difference corresponding to the second cylinder falls within a predetermined range; and if the difference between the present general rotational difference weighed average and the rotational difference corresponding to the second cylinder falls within the predetermined range obtaining a new general rotational difference weighed average by weight averaging the present general rotational difference weighed average with the corrected rotational difference corresponding to the second cylinder, obtaining a difference between the new general rotational difference weighed average and the rotational difference corresponding to the second cylinder by subtracting the new general rotational difference weighed average from the rotational difference corresponding to the second cylinder, and obtaining a new rotational difference correction value corresponding to the second cylinder by weight averaging the present rotational difference correction value corresponding to the second cylinder with the difference between the new general rotational difference weighed average and the rotational difference corresponding to the second cylinder.

13. A misfire discriminating method in accordance with claim 10, further including determining whether predetermined misfire diagnosis conditions are satisfied by present engine operating conditions.

14. A misfire discriminating method in accordance with claim 13, further including:

when a misfire condition for the combustion stroke of the second cylinder is discriminated, incrementing a value of a first counter; and when the predetermined misfire diagnosis conditions are satisfied by present engine operating conditions, incrementing a value of a second counter, determining if the value of the second counter exceeds a predetermined limit;

if the value of the second counter exceeds the predetermined limit, 1) obtaining a misfire rate by dividing the value of the first counter by the value of the second counter, comparing the misfire rate with a predetermined set value and a) if the misfire rate exceeds the predetermined set value determining whether a first misfire flag is set, and if the first misfire flag is set, setting a second misfire flag, and if the first misfire flag is not set, setting the first misfire flag and resetting a value of ae non-abnormality counter, and b) if the misfire rate does not exceed the predetermined set value, incrementing the value of the non-abnormality counter, and if the value of the non-abnormality counter is greater than or equal to a predetermined non-abnormality value, resetting the value of the first misfire flag and the value of the second misfire flag, and 2) resetting the value of the first counter and the value of the second counter.

15. A misfire discriminating apparatus for an engine having cylinders, comprising:

first sensing means for sensing a first engine speed during a combustion stroke of a first cylinder;

second sensing means for sensing a second engine speed during a combustion stroke of a second cylinder previous to the combustion stroke of the first cylinder;

calculating means for calculating a rotational difference corresponding to the first cylinder by subtracting the second engine speed from the first engine speed;

correcting means for correcting the rotational difference corresponding to the first cylinder by subtracting a present rotational difference correction value corresponding to the first cylinder from the rotational difference corresponding to the first cylinder to obtain a corrected rotational difference corresponding to the first cylinder;

determining means for determining a rotational difference change corresponding to the first cylinder by subtracting a corrected rotational difference corresponding to the second cylinder from the corrected rotational difference corresponding to the first cylinder; and misfire judging means for judging a misfire condition for the combustion stroke of the second cylinder when the rotational difference change corresponding to the first cylinder is larger than a first predetermined misfire level and a rotational difference corresponding to the second cylinder change is smaller than a second predetermined misfire level.

16. A misfire discriminating apparatus according to claim 15, wherein any of the sensing means includes a crank plate mounted to a crankshaft of the engine, and a crank angle sensor for detecting an angular position of the crank plate.

17. A misfire discriminating apparatus according to claim 15, wherein any of the sensing means includes a camshaft plate mounted to a camshaft of the engine, and a cam angle sensor for detecting an angular position of the cam plate.

18. A misfire discriminating apparatus in accordance with claim 15, wherein the second predetermined misfire level is a negative value of the first predetermined misfire level.

19. A misfire discriminating apparatus in accordance with claim 15 further including:

difference obtaining means for obtaining, when a misfire condition for the second combustion stroke is discriminated, a difference between a present general rotational difference weighed average and a rotational difference corresponding to the second cylinder by subtracting the present general rotational difference weighed average from the rotational difference corresponding to the second cylinder;

range determining means for determining, when the difference between the present general rotational difference weighed average and the rotational difference corresponding to the second cylinder has been obtained, whether the difference between the present general rotational difference weighed average and the rotational difference corresponding to the second cylinder falls within a predetermined range; and new rotational difference correction value obtaining means for obtaining, when the difference between the present general rotational difference weighed average and the rotational difference corresponding to the second cylinder falls within the predetermined range
  1.) a new general rotational difference weighed average by weight averaging the present general rotational difference weighed average with the corrected rotational difference corresponding to the second cylinder,
  2.) a difference between the new general rotational difference weighed average and the rotational difference corresponding to the second cylinder by subtracting the new general rotational difference weighed average from the rotational difference corresponding to the second cylinder, and
  3.) a new rotational difference correction value corresponding to the second cylinder by weight averaging the present rotational difference correction value corresponding to the first cylinder with the difference between the new general rotational difference weighed average and the rotational difference corresponding to the second cylinder.

20. A misfire discriminating apparatus in accordance with claim 15, further including diagnosis conditions determining means for determining whether predetermined misfire diagnosis conditions are satisfied by present engine operating conditions.

21. A misfire discriminating apparatus in accordance with claim 20, further including:
  a first counter which increments when a misfire condition for the combustion stroke of the second cylinder is discriminated; and
  a second counter which increments when the diagnosis conditions determining means determines that the misfire diagnosis conditions are satisfied by present engine operating conditions,
  limit determining means for determining if the value of the second counter exceeds a predetermined limit; and
  misfire abnormality determining means for
    if the value of the second counter exceeds the predetermined limit,
      1) obtaining a misfire rate by dividing the value of the first counter by the value of the second counter, comparing the misfire rate with a predetermined set value and
        a) if the misfire rate exceeds the predetermined set value determining whether a first misfire flag is set, and if the first misfire flag is set, setting a second misfire flag, and if the first misfire flag is not set, setting the first misfire flag and resetting a current non-abnormality value; and
        b) if the misfire rate does not exceed the predetermined set value, incrementing the current non-abnormality value, and if the current non-abnormality value is less than a predetermined non-abnormality value, resetting the value of the first misfire flag and the value of the second misfire flag, and
      2) resetting the value of the first counter and the value of the second counter.

22. A misfire discriminating apparatus for an engine having cylinders, comprising:
  first sensing means for sensing a first engine speed during a combustion stroke of a first cylinder;
  second sensing means for sensing a second engine speed during a combustion stroke of a second cylinder previous to the combustion stroke of the first cylinder;
  calculating means for calculating a rotational difference corresponding to the first cylinder by subtracting the second engine speed from the first engine speed;
  correcting means for correcting the rotational difference corresponding to the first cylinder by subtracting a present rotational difference weighed average value corresponding to the first cylinder from the rotational difference corresponding to the first cylinder; and
  misfire judging means for judging a misfire condition for the combustion stroke of the first cylinder when the corrected rotational difference corresponding to the first cylinder is smaller than a negative value of a predetermined misfire level.

23. A misfire discriminating apparatus according to claim 22, wherein the first sensing means or the second sensing means includes
  a crank plate mounted to a crankshaft of the engine, and
  a crank angle sensor for detecting an angular position of the crank plate.

24. A misfire discriminating apparatus according to claim 22, wherein the first sensing means or the second sensing means includes
  a camshaft plate mounted to a camshaft of the engine, and
  a cam angle sensor for detecting an angular position of the cam plate.

25. A misfire discriminating apparatus in accordance with claim 22 further including:
  difference obtaining means for obtaining, when a misfire condition for the first combustion stroke is discriminated, a difference between a present general rotational difference weighed average and the rotational difference corresponding to the first cylinder by subtracting the present general rotational difference weighed average from the rotational difference corresponding to the first cylinder;
  range determining means for determining, when the difference between the present general rotational difference weighed average and the rotational difference corresponding to the first cylinder has been obtained, whether the difference between the present general rotational difference weighed average and the rotational difference corresponding to the first cylinder falls within a predetermined range; and
  new rotational difference correction value obtaining means for obtaining, when the difference between the present general rotational difference weighed average and the rotational difference corresponding to the first cylinder falls within the predetermined range 1.) a new general rotational difference weighed average by weight averaging the present general rotational difference weighed average with the corrected rotational difference corresponding to the first cylinder, 2.) a difference between the new general rotational difference weighed average and the rotational difference corresponding to the first cylinder by subtracting the new general rotational difference weighed average from the rotational difference corresponding to the first cylinder, and 3.) a new rotational difference correction value corresponding to the first cylinder by weight averaging the present rotational difference correction value corresponding to the first cylinder with the difference between the new general rotational difference weighed average and the rotational difference corresponding to the first cylinder.

26. A misfire discriminating apparatus in accordance with claim 22, further including diagnosis conditions determining means for determining whether predetermined misfire diagnosis conditions are satisfied by present engine operating conditions.

27. A misfire discriminating apparatus in accordance with claim 26, further including:

a first counter which increments when a misfire condition for the combustion stroke of the second cylinder is discriminated; and a second counter which increments when the diagnosis conditions determining means determines that the misfire diagnosis conditions are satisfied by present engine operating conditions, limit determining means for determining if the value of the second counter exceeds a predetermined limit; and misfire abnormality determining means for if the value of the second counter exceeds the predetermined limit, 1) obtaining a misfire rate by dividing the value of the first counter by the value of the second counter, comparing the misfire rate with a predetermined set value and a) if the misfire rate exceeds the predetermined set value determining whether a first misfire flag is set, and if the first misfire flag is set, setting a second misfire flag, and if the first misfire flag is not set, setting the first misfire flag and resetting a current non-abnormality value; and b) if the misfire rate does not exceed the predetermined set value, incrementing the current non-abnormality value, and if the current non-abnormality value is less than a predetermined non-abnormality value, resetting the value of the first misfire flag and the value of the second misfire flag, and 2) resetting the value of the first counter and the value of the second counter.

28. A misfire discriminating apparatus for an engine having cylinders, comprising:

first sensing means for sensing a first engine speed during a combustion stroke of a first cylinder;

second sensing means for sensing a second engine speed during a combustion stroke of a second cylinder previous to the combustion stroke of the first cylinder;

calculating means for calculating a rotational difference corresponding to the first cylinder by subtracting the second engine speed from the first engine speed;

correcting means for correcting the rotational difference corresponding to the first cylinder by subtracting a present rotational difference correction value corresponding to the first cylinder from the rotational difference corresponding to the first cylinder to obtain a corrected rotational difference corresponding to the first cylinder;

determining means for determining a rotational difference change corresponding to the first cylinder by subtracting a corrected rotational difference corresponding to the second cylinder from the corrected rotational difference corresponding to the first cylinder; and misfire judging means for judging a continuation of a misfire condition when the rotational difference change corresponding to the first cylinder is larger than a first predetermined misfire level and a rotational difference change corresponding to the second cylinder is equal to or smaller than a second predetermined misfire level, and a finish of the misfire condition when the rotational difference change corresponding to the second cylinder is larger than the first predetermined misfire level.

29. A misfire discriminating apparatus according to claim 28, wherein any of the sensing means includes a crank plate mounted to a crankshaft of the engine, and a crank angle sensor for detecting an angular position of the crank plate.

30. A misfire discriminating apparatus according to claim 28, wherein any of the sensing means includes a camshaft plate mounted to a camshaft of the engine, and a cam angle sensor for detecting an angular position of the cam plate.

31. A misfire discriminating apparatus in accordance with claim 28, wherein the second predetermined misfire level is a negative value of the first predetermined misfire level.

32. A misfire discriminating apparatus in accordance with claim 28, further including:

difference obtaining means for obtaining, when a misfire condition for the second combustion stroke is discriminated, a difference between a present general rotational difference weighed average and a rotational difference corresponding to the second cylinder by subtracting the present general rotational difference weighed average from the rotational difference corresponding to the second cylinder;

range determining means for determining, when the difference between the present general rotational difference weighed average and the rotational difference corresponding to the second cylinder has been obtained, whether the difference between the present general rotational difference weighed average and the rotational difference corresponding to the second cylinder falls within a predetermined range; and new rotational difference correction value obtaining means for obtaining, when the difference between the present general rotational difference weighed average and the rotational difference corresponding to the second cylinder falls within the predetermined range 1.) a new general rotational difference weighed average by weight averaging the present general rotational difference weighed average with the corrected rotational difference corresponding to the second cylinder, 2.) a difference between the new general rotational difference weighed average and the rotational difference corresponding to the second cylinder by subtracting the new general rotational difference weighed average from the rotational difference corresponding to the second cylinder, and 3.) a new rotational difference correction value corresponding to the second cylinder by weight averaging the present rotational difference correction value corresponding to the first cylinder with the difference between the new general rotational difference weighed average and the rotational difference corresponding to the second cylinder.

33. A misfire discriminating apparatus in accordance with claim 28, further including diagnosis conditions determining means for determining whether predetermined misfire diagnosis conditions are satisfied by present engine operating conditions.

34. A misfire discriminating apparatus in accordance with claim 33, further including:

a first counter which increments when a misfire condition for the combustion stroke of the second cylinder is discriminated; and a second counter which increments when the diagnosis conditions determining means determines that the misfire diagnosis conditions are satisfied by present engine operating conditions, limit determining means for determining if the value of the second counter exceeds a predetermined limit; and misfire abnormality determining means for if the value of the second counter exceeds the predetermined limit, 1) obtaining a misfire rate by dividing the value of the first counter by the value of the second counter, comparing the misfire rate with a predetermined set value and a) if the misfire rate exceeds the predetermined set value determining whether a first misfire flag is set, and if the first misfire flag is set, setting a second misfire flag, and if the first misfire flag is not set, setting the first misfire flag and resetting a current non-abnormality value; and b) if the misfire rate does not exceed the predetermined set value, incrementing the current non-abnormality value, and if the current non-abnormality value is less than a predetermined non-abnormality value, resetting the value of the first misfire flag and the value of the second misfire flag, and 2) resetting the value of the first counter and the value of the second counter.

* * * * *